United States Patent
Kaplan et al.

(10) Patent No.: US 12,442,732 B2
(45) Date of Patent: Oct. 14, 2025

(54) ORGANOIDS AND METHODS OF MAKING AND USING THE SAME

(71) Applicant: Trustees of Tufts College, Medford, MA (US)

(72) Inventors: David L. Kaplan, Concord, MA (US); Rachael N. Parker, Medford, MA (US)

(73) Assignee: Trustees of Tufts College, Medford, MA (US)

( * ) Notice: Subject to any disclaimer, the term of this patent is extended or adjusted under 35 U.S.C. 154(b) by 255 days.

(21) Appl. No.: 17/302,069

(22) Filed: Apr. 22, 2021

(65) Prior Publication Data

US 2021/0333178 A1    Oct. 28, 2021

Related U.S. Application Data

(60) Provisional application No. 63/110,333, filed on Nov. 5, 2020, provisional application No. 63/014,045, filed on Apr. 22, 2020.

(51) Int. Cl.
*G01N 1/30* (2006.01)

(52) U.S. Cl.
CPC ......... *G01N 1/30* (2013.01); *G01N 2001/305* (2013.01)

(58) Field of Classification Search
CPC .......................... G01N 1/30; G01N 2001/305
See application file for complete search history.

(56) References Cited

U.S. PATENT DOCUMENTS

2019/0145868 A1* 5/2019 Chung ..................... G01N 1/30
                                                          435/40.5

OTHER PUBLICATIONS

Huang, W. et al. Design of Multistimuli Responsive Hydrogels Using Integrated Modeling and Genetically Engineered Silk-Elastin-Like Proteins, 2016, Advanced Functional Materials, 26: 4113-4123 (Year: 2016).*
McGill, M. et al. Molecular and macro-scale analysis of enzyme-crosslinked silk hydrogels for rational biomaterial design, 2017, Acta Biomaterialia, 63: 76-84 (Year: 2017).*

* cited by examiner

*Primary Examiner* — Blaine Lankford
(74) *Attorney, Agent, or Firm* — GTC Law Group PC & Affiliates

(57) ABSTRACT

Compositions and methods for improved histological analysis of organoids are disclosed. The compositions and methods include silk-elastin-like polymers have temperature-induced shape change properties.

20 Claims, 9 Drawing Sheets
(8 of 9 Drawing Sheet(s) Filed in Color)
Specification includes a Sequence Listing.

ORGANOIDS AND METHODS OF MAKING AND USING THE SAME

BACKGROUND

This application is related to, claims priority, and incorporated herein by reference for all purposes U.S. Provisional Patent Application Nos. 63/014,045, filed Apr. 22, 2020, and 63/110,333, filed Nov. 5, 2020.

STATEMENT REGARDING FEDERALLY SPONSORED RESEARCH

Not applicable.

REFERENCE TO A SEQUENCE LISTING

This application contains a sequence listing as an ASCII text file identified by the file name "2095.0128_sequence listings_ST25" created on Mar. 27, 2023, and having a size of 70 kb, which is hereby incorporated herein by reference.

BACKGROUND

Three-dimensional organoid tissue models present a unique method for studying numerous biological processes with utility in providing insights into tissue development, disease formation, and human health in general. Development of organoid cultures to generate organ-specific tissue results in model systems that are developmentally representative of physiological tissues and their environment. Many organoid systems have been developed for brain, lung, intestine, kidney, and liver that give rise to improved in vitro methodologies for the study of tissue structure and function, surpassing traditional 2D tissue culture approaches. These advances with organoid technology hold promise for understanding disease progression as well as for use in screening and identifying novel therapeutics. However, current limitations in processing organoids limit the capacity for higher-throughput analysis. A system that increases the efficiency of evaluation of organoid tissue samples would enhance the utility of these systems for a range of applications.

SUMMARY

In an aspect, the present disclosure provides an embedded organoid for improved histological sample preparation. The embedded organoid includes an organoid embedded within a hydrogel matrix. The hydrogel matrix has a chemical composition consisting essentially of one or more silk-elastin-like polymers (SELPs), water, and an optional bulking agent. The hydrogel matrix has undergone a temperature-induced shape change. Subjecting the embedded organoid to histological sample preparation involving sectioning the embedded organoid results in a histological sample with reduced organoid damage when compared to a comparison histological sample prepared by subjecting a non-embedded organoid to the histological sample preparation involving sectioning the non-embedded organoid.

In another aspect, the present disclosure provides a hydrogel matrix for receiving an organoid for histological sampling. The hydrogel matrix has a chemical composition consisting essentially of one or more silk-elastin-like polymers (SELPs), water, and an optional bulking agent. The pre-shape-change physical configuration includes a receiving area adapted to receive the organoid. The chemical composition is adapted to provide a temperature-induced shape change. The pre-shape-change physical configuration and the temperature-induced shape change are adapted together to encapsulate the organoid upon placement of the organoid at the receiving area and exposure of the hydrogel matrix to a predetermined temperature for a predetermined length of time.

In a further aspect, the present disclosure provides a method. The method includes: a) placing an organoid in a SELP hydrogel matrix; b) applying heat to induce a conformational change; and c) sectioning the embedded organoid to produce a histological sample.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
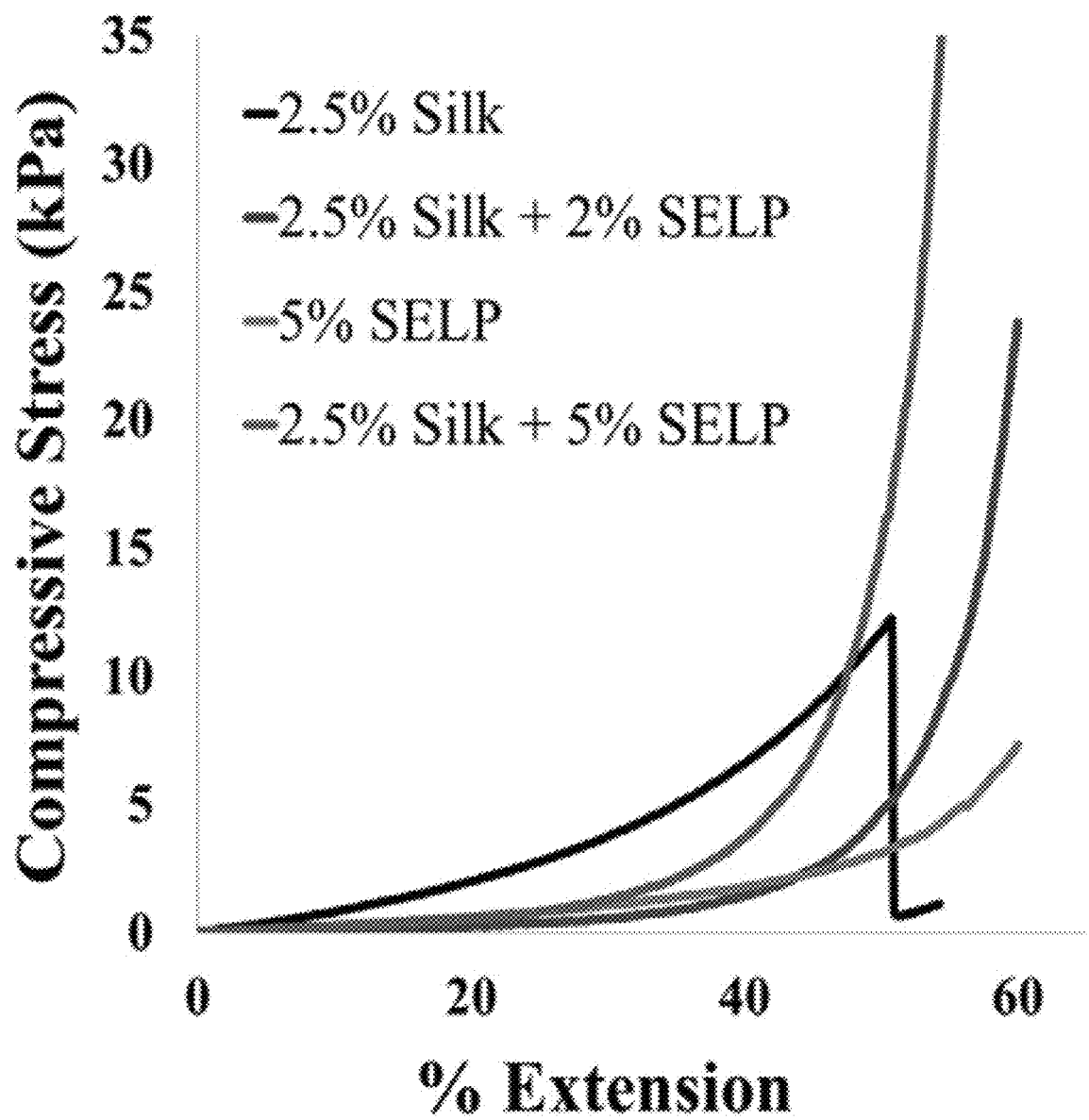
FIG. 1A is a plot of mechanical analysis of SELP-silk hybrid gels. Mechanical analysis of 2.5% silk (black silk), 2% SELP blend with 2.5% silk (blue curve), 5% SELP (green curve), and 5% SELP blend with 2.5% silk (red curve).

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Compositions and methods for embedding organoids are disclosed. The compositions can include an embedded organoid. The compositions can include a hydrogel matrix. The embedded organoid itself is also disclosed.

The hydrogel matrix is adapted for receiving an organoid for histological sampling. The hydrogel has a chemical composition and a pre-shape-change physical configuration. This composition and configuration are adapted to work in concert to provide the organoid embedding capabilities of the hydrogel matrix.

The embedded organoid provides improved histological sample processing capabilities. The embedded organoid comprises an organoid embedded within a hydrogel matrix. The hydrogel matrix is described herein. Subjecting the embedded organoid to histological sampling preparation involving sectioning the embedded organoid results in a histological sample with reduced organoid damage when compared to a comparison histological sample prepared by subjecting a non-embedded organoid to the histological sample preparation involving sectioning the non-embedded organoid.

The chemical composition consists essentially of one or more silk-elastin-like polymers (SELPs), water, and an optional bulking agent. The chemical composition is adapted to provide a temperature-induced shape change.

The pre-shape-change physical configuration includes a receiving area that is adapted to receive the organoid.

The pre-shape-change physical configuration and the temperature-induced shape change are adapted together to encapsulate the organoid upon placement of the organoid at the receiving area and exposure of the hydrogel matrix to a predetermined temperature for a predetermined length of time.

The one or more SELPs can comprise the sequence ((GAGAGS)n(GVGVP)i(GXGVP)k(GVGVP)j)x(SEQ ID NO.1), wherein a ratio of (i+j+k) to n is between 3:1 and 12:1, wherein n is 1, 2, or 3, wherein i is between 0 and 35, wherein k is 1, wherein j is between 0 and 36, wherein i+j is between 3 and 35, wherein x is between 5 and 20, and wherein X is an amino acid other than valine.

In a certain aspect, the hydrogel matrix has the aforementioned sequence, wherein n is 2, wherein i is 4, wherein j is 3, and wherein X is tyrosine. In some cases, the hydrogel matrix has integer multiples of the formula defined in the previous sentence.

The one or more SELPs has a transition temperature that is tailored for the desired shape change characteristics. The one or more SELPs has a transition temperature of at least 20° C., at least 22° C., at least 25° C., at least 27° C., at least 30° C., at least 35° C., or at least 37° C. The one or more SELPs has a transition temperature of at most 60° C., at most 57° C., at most 55° C., at most 52° C., at most 50° C., at most 48° C., at most 45° C., at most 43° C., at most 40° C., or at most 37° C. Transition temperatures can be measured using differential scanning calorimetry or other methods known to those having ordinary skill in the art.

The temperature-induced shape change applies a force to the organoid. Balancing this force is important for proper sample processing. If the force is too low, then the organoid is not properly embedded and the sample processing becomes too similar to standard processing of organoids. In other words, if the force is too low, then the advantages associated with embedding the organoid are not realized. On the other hand, if the force is too high, then the organoid can be deformed by the force or even damaged by the force. Histological processing of deformed organoids is of little to no value.

The bulking agent can provide additional structural stability to the hydrogel and the embedded organoid without negatively impacting the shape change properties. The bulking agent can be silk fibroin.

In some cases, it can be advantageous to enzymatically crosslink the SELPs to one another and/or to enzymatically crosslink the SELPs to the bulking agent. The degree of crosslinking can be tailored to provide desired mechanical properties.

The predetermined temperature at which the shape change of the hydrogel matrix occurs is at least 40° C., at least 45° C., at least 50° C., at least 55° C., at least 60° C., or at least 70° C. The predetermined temperature is at most 75° C., at most 70° C., or at most 65° C.

The predetermined length of time that the hydrogel matrix is exposed to the predetermined temperature to induce the shape change is at least 5 minutes, at least 10 minutes, at least 15 minutes, at least 30 minutes, at least 45 minutes, or at least 60 minutes. The predetermined length of time is at most 6 hours, at most 5 hours, at most 3 hours, at most 2 hours, at most 90 minutes, or at most 60 minutes.

The hydrogel matrices described herein can be arranged in an array to further facilitate high-throughput organoid processing.

The present disclosure includes a method of using the hydrogel matrices described herein. The method includes: a) placing an organoid in a SELP hydrogel matrix; b) applying heat to induce a conformational change; and c) sectioning the embedded organoid to produce a histological sample. The hydrogel matrix of this method is the hydrogel matrix described herein.

During the method, the SELP hydrogel matrix can be maintained in a desired state of hydration by retaining contact with water during the applying heat of step b).

Applicant appreciates that SELPs encompass a significant number of distinct chemistries and that it would be practically impossible to manufacture each individual variation of SELP for the purposes of determining if one can properly achieve the compositions and methods described herein, including the disclosed shape change properties. Applicant provides here some design principles that significantly narrows the universe of possibilities that which would allow the identification of other SELPs that are suitable for use in the present disclosure without requiring undue experimentation.

The general screening parameters include, but are not limited to, transition temperature, mechanical strength, amount of shape-change, and scalability (yield) of production for each SELP. Each of these properties can be tested on a smaller scale sample, without requiring the production of a full hydrogel matrix having the shape necessary for embedding an organoid.

One screening consideration is the yield from synthesizing the SELP. Put simply, SELPs that are made from reactions with low yield are not likely to be desirable in the present disclosure. In some cases, the achievable yield might change over time, so SELPs that are not considered in one instance due to low yield might be later considered if the method of making the SELP changes and the yield becomes improved in the future. Applicant has generally observed that the size of the SELP is inversely correlated with the yield, so if longer SELPs are desired for material property purposes, the quality of those material properties would be balanced with the yield to better evaluate the efficacy of that those longer SELPs.

Another screening consideration is the transition temperature, as referenced above. The transition temperature can be determined before the entire hydrogel matrix is assembled, so this pre-screening can be broadly applied without significant investment in testing the hydrogel matrix itself. Applicant discovered that charged or aromatic amino acids can increase the transition temperature, so including such charged or aromatic amino acids is one approach to tailoring the transition temperature, though skilled artisans would recognize that others are suitable as well.

Modifying the SELP's protein size and sequence composition are straightforward to a person having ordinary skill in the art. Thus, a skilled artisan could readily prepare a wide variety of size and sequence combinations for screening.

Applicant has deployed the creation of a library of SELPs with various size and sequence modification to determine the aforementioned trends in SELP properties and this process can be further deployed for screening SELPs for determining whether to further investigate their use in the compositions and methods described herein.

After initial screening of SELPs, the hydrogel matrix disclosed herein can be formed for further optimization and tuning. The hydrogel matrix can be investigated to determine if desired shape change properties are present. Screening the material properties of the hydrogel matrices can be achieved with rheological testing known to those having ordinary skill in the art. Small hydrogel samples of a few mm in diameter can be prepared to test temperature-responsiveness. The overall surface area change of the material is representative of its degree of shape change. Generally, hydrogel matrices with between 20% and 60% shape change have shown promising performance capabilities. Above 60% shape change, the materials have tended to be too weak for use in the sample processing methods described herein. Below 20% shape change, the hydrogel matrix may not fully embed the organoid.

One material property that is important for the hydrogel matrix is sufficient material strength to be handled by a lab technician. This can be readily screened by preparing small samples of hydrogel matrix material. Without wishing to be bound by any particular theory, it is believed that materials having a mechanical strength of around 2-3 kPa were suitably strong for handling.

The rheological testing can also be utilized to study gel formation and atomic force microscopy indentation of nanoindentation can further elucidate material properties, such as elasticity and modulus. Comparison of these properties with those of the materials that are known to function (i.e., those exemplified herein) can be useful in screening additional materials.

Example 1

Biosynthesis of SELP Proteins: Each SELP was constructed using the silk-elastin motif "SnEmY" where S corresponds to the silk sequence GAGAGS (SEQ ID NO.2) and E to the elastin sequence GVGVP (SEQ ID NO.3). The ratio of silk to elastin is denoted by n:m and Y refers to a tyrosine residue substituted in position 2 of the fifth repeat of the elastin domain to give one GYGVP (SEQ ID NO.4) elastin repeat per monomer unit. The size of the constructs ranged from 4 to 12 repeating units of S2E8Y monomers (thus, 15 to 51 kDa). Proteins were produced according to the previously described procedures. [9b,10] Briefly, expression vectors containing DNA sequences were transformed in BL21 (DE3) competent *E. coli* cells (New England Biolabs, Ipswich, MA) and expressed under the T7 promoter. Following transformation, cells containing the expression plasmids were grown overnight for 16 h in 50 mL of Lysogeny Broth (LB) media at 37° C. with shaking at 250 rpm. Athena ES Hyper Broth (Fisher Scientific, Hampton, NH) was then used to dilute the culture in a 1:100 ratio and cells were grown to an optical density (OD) of 0.8-1.0 before inducing protein expression with the addition of $1 \times 10^{-3}$ m isopropyl β-D-1-thiogalactopyranoside (IPTG). Proteins were expressed at 37° C. for 5 h followed by harvesting of cells by centrifugation at 5000 rpm for 15 min. Cells were then resuspended in PBS and stored at −20° C. until purification. All SELPs were purified using the previously described inverse transition temperature cycling (ITC) protocol. See, W. Huang, A. Tarakanova, N. Dinjaski, Q. Wang, X. Xia, Y. Chen, J. Y. Wong, M. J. Buehler, D. L. Kaplan, *Adv. Funct. Mater.* 2016, 26, 4113. Following purification, SELPs were dialyzed against deionized water for 3 days before freeze-drying and storing for further use.

Preparation of Aqueous Silk Fibroin Solution—Silk Extraction: Silk fibroin was isolated from cocoons produced by *Bombyx mori* silkworms following the previously published methods. See, D. N. Rockwood, R. C. Preda, T. Yücel, X. Wang, M. L. Lovett, D. L. Kaplan, *Nat. Protoc.* 2011, 6, 1612. Briefly, silk cocoons were boiled in 0.02 m sodium bicarbonate for 60 min followed by drying of silk fibers at room temperature for 3 days. Lithium bromide (9.3 m) was used to dissolve silk for 2 h at 60° C. Dialysis of the soluble silk solution against distilled water over 3 days was performed to obtain a silk solution of ~8.5% w/v. Silk solution diluted with water to a final concentration of 1.25-2.5% w/v was used to resuspend freeze-dried SELP proteins.

Fabrication of Enzymatically Crosslinked SELP Hydrogels: Horseradish peroxidase (HRP) and hydrogen peroxide (H2O2) were used in an oxidation reaction to form the hydrogels through crosslinking of the tyrosine residues present in the SELP and silk fibroin sequences. Silk solutions diluted with water to a final concentration of 1.25-2.5% w/v, or deionized water for SELP only gels, were used to resuspend freeze-dried SELP proteins to a final concentration of 2-5% w/v. Solutions containing SELP only or silk and SELP were incubated with mixing using a rotating mixer at 4° C. for 16 h prior to gelation. The hydrogels were fabricated using a previously optimized procedure for silk HRP crosslinked materials. See, M. McGill, J. M. Coburn, B. P. Partlow, X. Mu, D. L. Kaplan, *Acta Biomater.* 2017, 63, 76. Briefly, HRP type VI lyophilized powder (Sigma-Aldrich, St. Louis, MO) reconstituted in deionized water at concentration of 10,000 U mL$^{-1}$ was added to the protein solution to obtain a final concentration of 10 U mL-1, followed by thorough mixing through gentle pipetting. H2O2 solution (37% $H_2O_2$, Sigma Aldrich, St. Louis, MO) was then added to a final concentration of $2.5 \times 10^{-3}$ m. Following thorough mixing, the reaction was allowed to proceed at room temperature for 6 h to form the enzymatically cross-linked gels.

Mechanical Analysis—Compression Testing: The mechanical properties of the hydrogels were characterized using an Instron 3366 universal testing system (Instron, Norwood, MA). The hydrated hydrogels with a cylindrical shape (diameter ≈6.7 mm, height ≈6 mm) were loaded onto the frame at room temperature. Samples were compressed at a rate of 2.0 mm min-1. Hydrogels were incubated in deionized water at 4° C. for 1 day prior to compression testing. Compressive modulus was calculated at 20% and 40% strains for comparison for all samples. Sample moduli are reported as the average of three measurements.

Scanning Electron Microscopy: Zeiss Evo MA10 scanning electron microscope (SEM) (Carl Zeiss Microscopy, Germany) was used to analyze morphological properties of the SELP hydrogels. Hydrogels were analyzed after flash freezing using liquid nitrogen and freeze-drying. Cross-sections were observed by fracturing gels to expose the cross-section. Samples were sputter coated with gold for SEM analysis and images were taken at EHT level of 5 kV using secondary electron detection.

Differential Scanning calorimetry (DSC): Differential scanning calorimetry (DSC) measurements were performed using Nano DSC II Model 6100 (calorimetry Sciences Corp., Lindon, UT). A 2% SELP solution was added to the DSC sample chamber for each protein measurement. The transition temperature of SELPs was measured by heating the sample chamber from 0 to 100° C. at a rate of 2° C. min-1 followed by cooling to 0° C. at the same rate. Equivalent solvent volume was added to the reference during analysis. Baseline scans using the solvent only were analyzed in the same manner and subtracted from all samples.

SELP Hydrogel Array Casting Mold Fabrication: Two custom molds were created to produce white delrin well plates modified from the dimensions of the bottom of a 96-well plate. The molds were designed using SolidWorks software. The critical dimensions that mimic the standard 96-well plate (Cellvis, Mountain View, CA) included the 6.8 mm diameter well pillar and the 9 mm well pillar spacing (center to center). The critical modifications included the 3 mm height of the well pillars and the change in array dimensions, 4×6 and 4×3 well setup as opposed to a 96 well array. A notch in the upper right-hand corner of the mold was added for orientation purposes. The molds were fabricated from white delrin acetal resin sheets (McMaster-Carr, Robbinsville, NJ) and machined at the Tufts University SCT Machine Shop (Medford, MA) using the DPM SX3P Bed-Mill with the ProtoTRAK SMX CNC (Southwestern Industries, Inc, Rancho Dominguez, CA). Molds were treated with 1% w/v Pluronic F-127 (Sigma-Aldrich) solution in deionized water for 4 h prior to hydrogel casting. Following incubation with Pluronic F-127 solution, the solution was removed from the mold and excess liquid wiped away using a Kimwipe before allowing the mold to dry overnight.

SELP Hydrogel Preparation: The protein solutions were mixed and incubated at 4° C. as described above. HRP was then added to the protein solutions followed by thorough mixing. Initiation of the HRP crosslinking reaction was completed by adding $H_2O_2$ to the protein and HRP solution and mixing well by gently pipetting the solution. The entire reaction mixture was transferred to the Pluronic F-127 treated mold and incubated at RT (20° C.) for 6 h. Following completion of the reaction, the hydrogel was gently removed from the mold and incubated in 100 mL of DI water at 4° C. for 2 h. The organoids were then manually transferred to the hydrogel that was in a shallow dish of water. In this manner the hydrogel remains hydrated, but the organoids are not submerged in water. Incubation of hydrogel containing organoids was completed in DI water for 1 h at 65° C. to allow for material contraction to occur. This temperature was determined as sufficient for shape-change and time efficient and was therefore used for all thermal procedures. Immediate transfer the hydrogel to the histology cassette followed the 65° C. incubation after which tissue processing cycles were run.

Histological Processing: Cerebral organoids were generated using human induced pluripotent stem cells (hiPSCs) cultured in suspension in low adhesion tissue culture plates for approximately three months. See, M. A. Lancaster, J. A. Knoblich, *Science* 2014, 345, 1247125. Organoids were fixed using 4% PFA and placed inside wells of pre-formed SELP hydrogels then subjected to increased temperatures (65° C.) for 60 min before placement of the entire construct inside a tissue processing cassette. A subset of organoids was loosely placed inside a separate tissue processing cassette as a histological control. Both cassettes were subsequently subjected to a standard tissue processing cycle (Sakura Tissue-Tek VIP Series Tissue Processor) and embedded in paraffin blocks. Paraffin sections 8-10 µm in thickness were prepared using a microtome (Leica) then subjected to hematoxylin & eosin (H&E) histological staining.

Statistical Analysis: All experiments were completed in triplicate. The data are presented as mean±standard deviation for n=3 samples.

SELPs used in this study correspond to the silk-elastin motif "SnEmY" where S is the silk sequence GAGAGS (SEQ ID NO.2) and E is the elastin sequence GVGVP (SEQ ID NO.3). N:M gives the ratio of silk to elastin and Y denotes a tyrosine residue in position 2 of the fifth repeat of the elastin domain. This nomenclature is used for all proteins discussed hereafter.

SELP sequences for analysis were selected with the objective of identifying protein constructions with transition temperatures ($T_t$)≥25° C. Previous work in our lab showed SELP S2E8Y with 12 repeating units had a $T_t$=25° C. We therefore hypothesized that decreasing the number of repeats would increase the secondary structure of the protein thus resulting in increased $T_t$ values. Proteins of 4, 6, 8, and 12 repeating units of S2E8Y were chosen for characterization and analysis for use as a histological transfer device. Further criteria for selection of a suitable sequence for the hydrogel transfer device included protein yield after purification, mechanical properties of the material, and temperature-responsiveness of the material.

All SELPs chosen with expected $T_t$ values ≥25° C. were expressed in *Escherichia coli* and subsequently purified using inverse temperature transition cycling (ITC). SELPs consisting of the S2E8Y motif with 6, 8, and 12 repeating units were produced at yields of 25-30 mg $L^{-1}$ following purification, which is sufficient for materials fabrication and testing, while S2E8Y4 averaged yields of 5-10 mg $L^{-1}$ (Table 1—Percentages are reported as the mean±standard deviation of 3 samples). Considering the scale of protein needed for fabrication of the SELP transfer devices, S2E8Y4 was excluded from further analysis as using the existing expression and purification protocols for SELP constructions did not result in enough material.

TABLE 1

| Clone | Name | Average yield [mg $L^{-1}$] | $T_t$ [° C.] | Shape change % |
|---|---|---|---|---|
| 1 | S2E8Y4 | 7.5 | 33 | NA |
| 2 | S2E8Y6 | 30 | 31 | 60 ± 7 |
| 3 | S2E8Y8 | 25 | 29 | 35 ± 5 |
| 4 | S2E8Y12 | 27 | 25 | 64 ± 3 |

Subsequently, SELP $T_t$ were measured using DSC to determine the applicability of the constructions for use in a room temperature laboratory environment. As predicted, an inverse relationship to molecular weight was observed; lower molecular weight constructions (i.e., fewer number of repeating silk-elastin units) resulted in higher transition temperatures. Specifically, S2E8Y4 exhibited a $T_t$=33° C., S2E8Y6=31° C., S2E8Y8=29° C., and S2E8Y12=25° C. (Table 1). These values fall in a range suitable for inducing shape-change at a temperature that is appropriate for maintaining organoid integrity and additionally allows for handling of the materials under standard temperature conditions.

Hydrogels fabricated using S2E8Y6, 8, and 12 were used to evaluate size changes upon exposure to thermal stimulus. Optimal sequences will respond to increased temperatures and contract at least 50% of the original size. With this metric, future fabrication of SELP hydrogel transfer devices can be tailored for contraction over a range of percentages dependent on the duration of exposure to thermal stimuli allowing for a variety of devices to be created with arrays specific to the application (i.e., organoid size). 2% w/v SELP hydrogels of S2E8Y 6mer, 8mer, and 12mer constructions were fabricated using horseradish peroxidase (HRP) mediated tyrosine crosslinking. Following completion of the crosslinking reaction, the hydrogels were incubated in water at room temperature (~20° C.) to swell the gels, as well as to remove residual HRP. The gels were then incubated at 65° C. (above the $T_t$ for all three protein gels) for 60 min to induce the thermal transition and the size changes from the initial room temperature conditions. The change in size was measured using ImageJ to assess area of the gel as a measure of contraction where the cross-sectional area of the material was measured before and after heating. Measurements are reported as an average with standard deviation across 3 samples. All SELP constructions exhibited shape change properties consistent with previously studied SELPs from our lab. S2E8Y 6mer and 12mer constructions showed an average reduction in size of ≈60% and ≈64%, respectively, while S2E8Y 8mer showed a ≈35% decrease in size (Table 1). The difference in extent of shape change may be due to the polymer chain packing density. However, further analysis is needed to elucidate the effect of protein length on stimuli responsiveness.

Selection of a final SELP variant was based on the protein yield, applicability of $T_t$, and extent of shape-change. S2E8Y12 ($T_t$=25° C.) displayed all desired qualities for the material and the greatest overall contraction. Additionally, S2E8Y12 exhibited more consistent behavior with change in size of 64±3% compared to S2E8Y8 at 60±7%. Consistent shape-change between batches will allow for more tunable materials and thus a wider range of arrays that can be achieved for histological processing. Therefore, S2E8Y12 was chosen for further characterization.

Implementation of the SELP hydrogels for histological processing requires materials with sufficient mechanical properties such that handling of the material does not result in breakage or tearing throughout the transfer process. SELP materials, while maintaining shape and integrity during analysis, require extreme care in handling and physical manipulation to avoid unwanted artifacts. To improve the mechanical properties of the hydrogels, S2E8Y12 was integrated with native silk fibroin material to generate more mechanically robust hydrogel systems and later improve utility of the material for downstream histological processing. The silk-SELP composite gels were fabricated using a previously optimized procedure for silk HRP crosslinked hydrogels. Composite hydrogels improved ease of handling but required increased concentrations of SELP proteins to maintain shape change properties as the silk concentration was increased from 1.25-2.5% w/v. For example, hydrogels with 5% SELP protein were used to achieve the same average contraction (~65%) for the composite materials with 2.5% silk compared to the 2% SELP only gels. Interestingly, varying the ratio of silk to SELP in the hydrogels allows for a range of control over gel response and mechanics. The highest reduction in overall size was observed when a composition of 1.25% silk and 2% SELP was blended and crosslinked, resulting in an average ~68% reduction in gel area with a temperature increase from 20 to 65° C. for 60 min. However, hydrogel mechanics were optimal using a 2.5% silk and 5% w/v SELP composition.

Figure 1B:
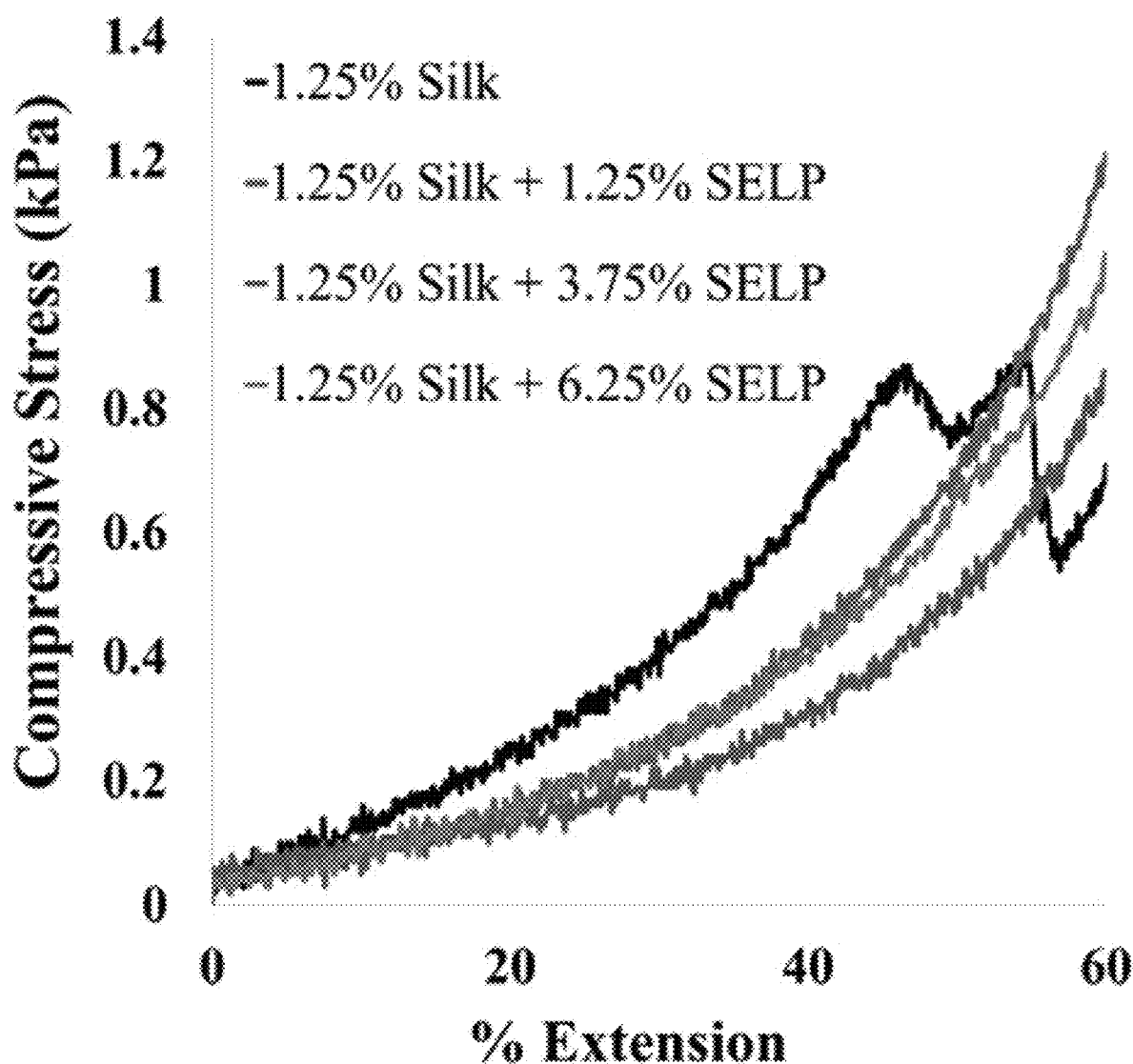
FIG. 1B is a plot of mechanical analysis of SELP-silk hybrid gels. Mechanical analysis of 1.25% silk (black silk), 1.25% SELP blend with 1.25% silk (red curve), 3.75% SELP blend with 1.25% silk (blue curve), and 6.25% SELP blend with 1.25% silk (green curve).

Compressive testing of silk-only, SELP-only, and silk-SELP composites was used to quantify the mechanical strength of the materials. Silk hydrogels show the highest modulus at 40% extension (6.4±1.0 kPa) followed by the 5% SELP blend hydrogel (2.5±0.9 kPa), and the 5% SELP only hydrogel (1.8±0.3 kPa) (FIG. 1A and Table 2). Additionally, the relationship between the silk and SELP concentrations used for hydrogel fabrication was analyzed and the silk concentration, as expected, determined the mechanical properties of the material (FIG. 1B). Silk weight percent contributed more to the increased mechanical strength than overall protein concentration. Increased S2E8Y12 does not significantly increase the crosslinking density of materials, while the elastin domains increased elasticity resulting in slightly weaker gels when the two components were blended. However, the silk fibroin increases the stiffness of the materials through increased crosslinking density. Silk fibroin is a tyrosine-rich protein, which significantly increases the number of sites available for HRP-mediated di-tyrosine bond formation compared to S2E8Y12 alone, which contains one tyrosine residue per repeat. A composite material with significant elastin is needed to maintain the stimuli responsive properties of the hydrogel while silk fibroin improves gel mechanics. This establishes a threshold for the necessary composite concentrations that can be used to generate the material and obtain optimal performance. Therefore, hydrogels of 2.5% silk and 5% SELP were selected for further analysis.

TABLE 2

| Composition | Avg. Pore Diameter at 20° C. [μm] | Avg. Pore Diameter at 65° C. [μm] | Young's Modulus [kPa] |
| --- | --- | --- | --- |
| 2.5% Silk | 49 ± 16 | 58 ± 23 | 6.4 ± 1.0 |
| 5% SELP | 33 ± 8 | 16 ± 6 | 1.8 ± 0.3 |
| 2% SELP Blend | 38 ± 12 | 30 ± 9 | 1.1 ± 0.2 |
| 5% SELP Blend | 29 ± 10 | 16 ± 3 | 2.5 ± 0.9 |

Figure 2A:
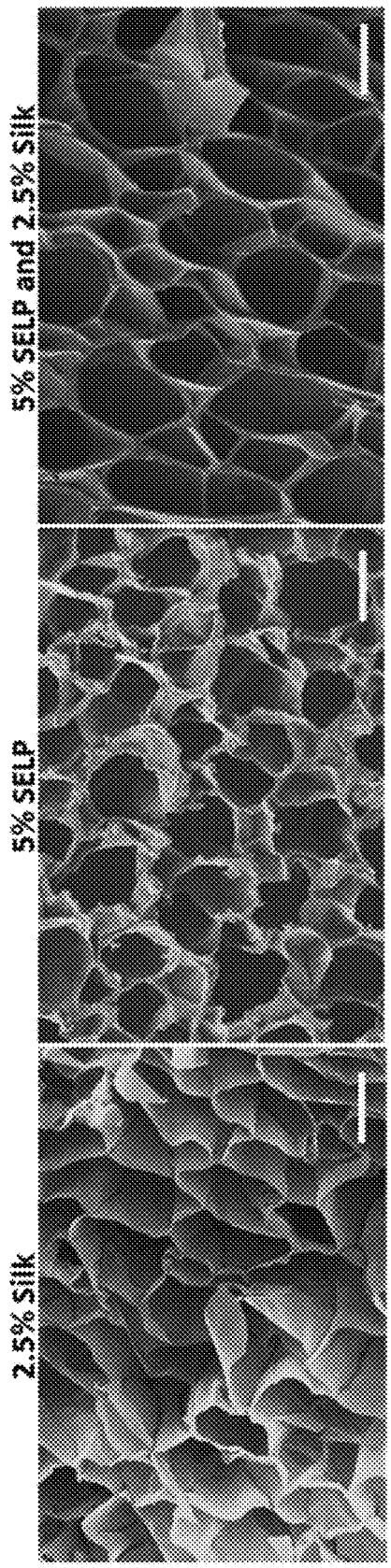
FIG. 2A is a series of SEM images of 2.5% silk, 5% SELP, and 5% SELP with 2.5% silk hybrid freeze dried hydrogels at 20° C. Scale bars=50 µm.
Figure 2B:
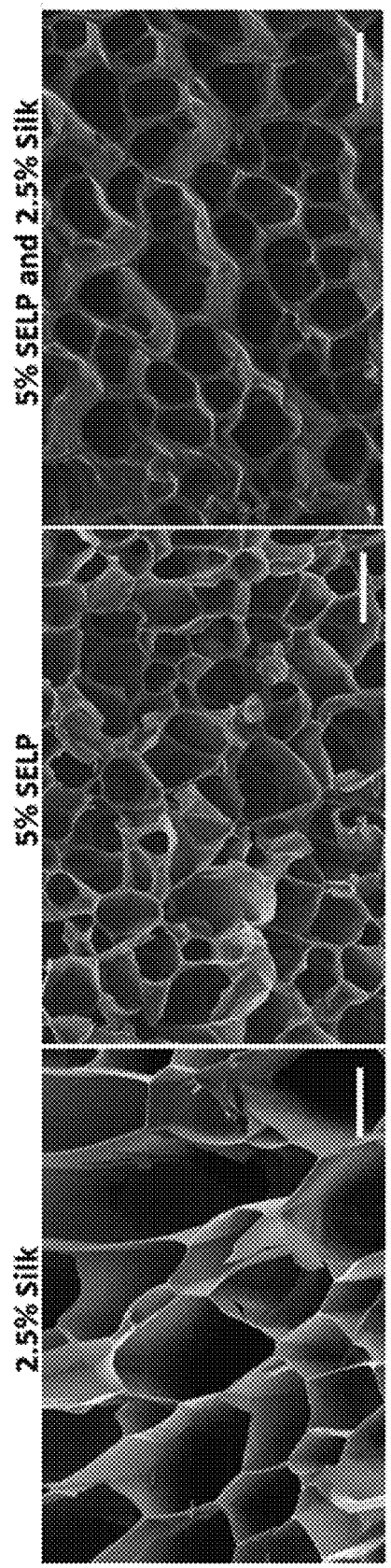
FIG. 2B is a series of SEM images of 2.5% silk, 5% SELP, and 5% SELP with 2.5% silk hybrid freeze dried hydrogels at 65° C. Scale bars=50 µm.

We further assessed morphological changes in the hydrogels by scanning electron microscopy (SEM). These results indicated that the materials fabricated using silk, SELP, and silk-SELP composites all formed porous network structures after the HRP crosslinking (FIGS. 2A-B). Following a 60 min equilibration at 20 or 65° C., the hydrogels were immediately flash frozen and freeze dried prior to SEM analysis. Samples equilibrated at 65° C. showed no change in pore size for the silk only samples. Decreased pore sizes were observed for the 5% SELP only (from 33 ±8 to 16±6 μm), 2% SELP blends with 2.5% silk (from 38±12 to 30±9 μm), and 5% SELP blends with 2.5% silk (from 29±10 to 16±3 μm). These results are consistent with the observed shape change of these materials (Table 1). For the subsequent histological evaluation, a 3× 4 and 6×8 array of a 96-well plate design was implemented to generate the composite hydrogel arrays and used to investigate the effects of the material on histological processing of organoids.

The 3×4 and 6×8 carrier arrays for the cerebral organoids were fabricated using a custom made mold for casting the solution prior to gelation. Molds designed and fabricated for 6 ×8 carrier arrays utilized optimal material surface area and increased throughput for histological analysis. Conversely, arrays generated for 3×4 arrangements can be used for larger organoid systems and provide additional area for organoid transfer. Given the range of material properties achievable with the SELP-based system, hydrogel array designs can be tailored to specific experimental needs. Additionally, fabrication of thermally responsive hydrogel arrays that match the surface area of a standard 96-well cell culture plate allow for direct transfer of organoids into the hydrogel using commercially available 96-well microplate aspirator adapters or through manual transfer. Specifically, in this study cerebral organoids were used as a proof-of-concept system to test S2E8Y12 hydrogel transfer devices for tissue processing and histological analysis. The molds implemented in this study were designed to produce hydrogels with a 40% reduction in size following organoid transfer, for a snug fit of organoids with an average size of ≈2 mm (consistent with the cerebral organoids). The material dimensions for the hydrogels allow for a compact fit inside a standard histology cassette following thermal contraction. Dimensions of the histology cassette were: outer dimensions equal to 28.5× 41×6.7 mm and inner dimensions equal to 26×30×5 mm.

Figure 3:
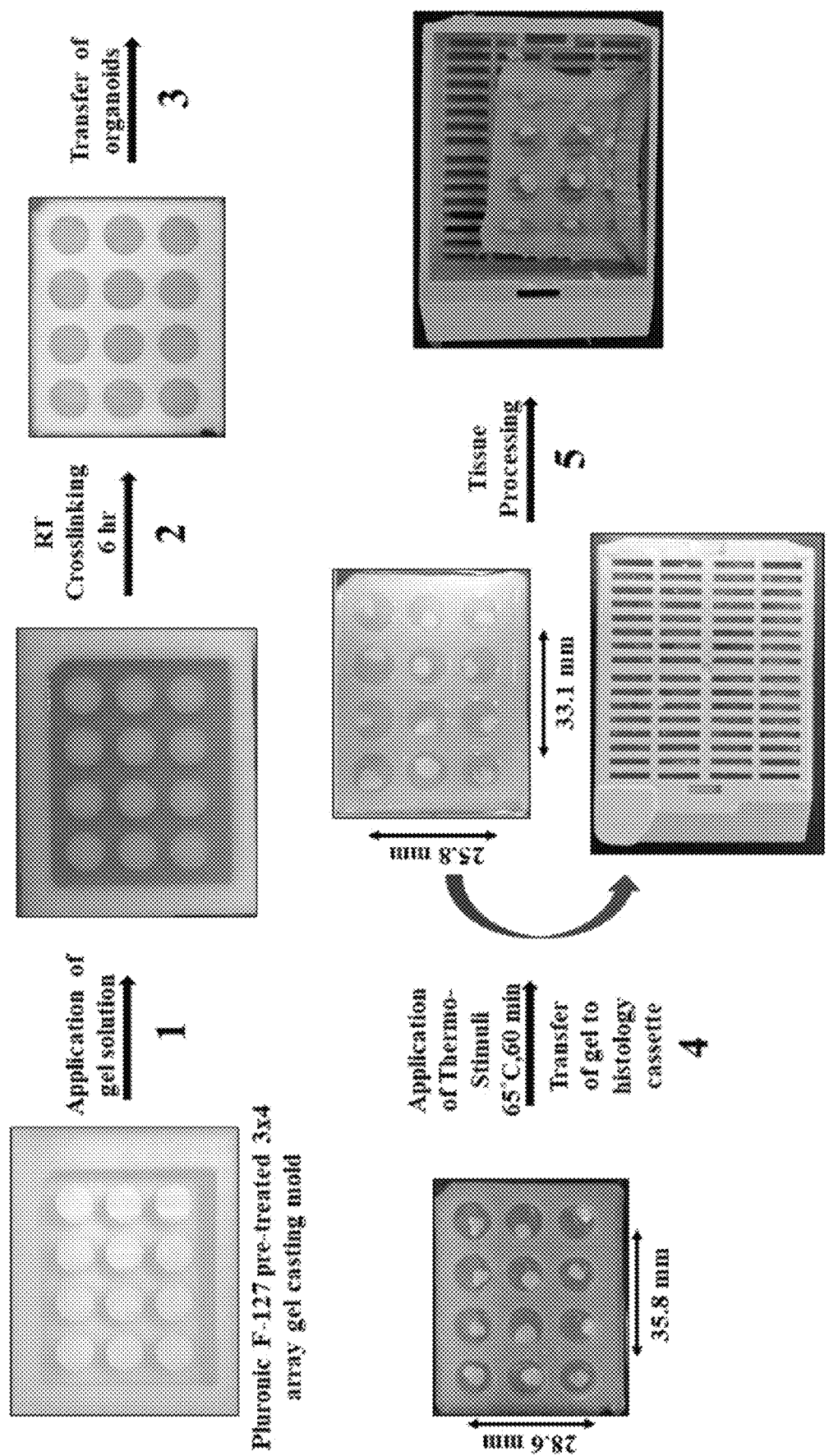
FIG. 3 is a workflow for making a thermos-responsive SELP device in accordance with aspects of the present disclosure. 1) SELP hydrogel solution cast into 3× 4 array mold. 2) HRP-mediated crosslinking reaction conducted at room temperature for 6 h. 3) Manual transfer of organoids to SELP material. 4) SELP material containing organoids incubated at 65° C. for 60 min. 5) Material transferred to histology cassette for subsequent tissue processing (tissue dehydration through a series of graded ethanol solutions, followed by xylene then paraffin infiltration).

Room temperature crosslinking of the SELP hydrogel solution generates an array of the desired size upon removal of the gel from the mold. Hydrogels equilibrated in deionized water enable removal of residual reactants and allow for gel hydration. Organoids can then be transferred from tissue culture plates while maintaining the correct orientation from the well plate, guided by the notched corner design of the delrin mold. Application of thermal stimuli to the gel equilibrated in water results in contraction of the SELP material followed by placement of the material into a standard histology cassette for subsequent tissue processing. A general workflow in accordance with the present disclosure is illustrated in FIG. 3.

Figure 4A:
FIG. 4A is an image of a thermo-responsive SELP device before paraffin embedding and sectioning. Scale bars=6.4 mm.
Figure 4B:
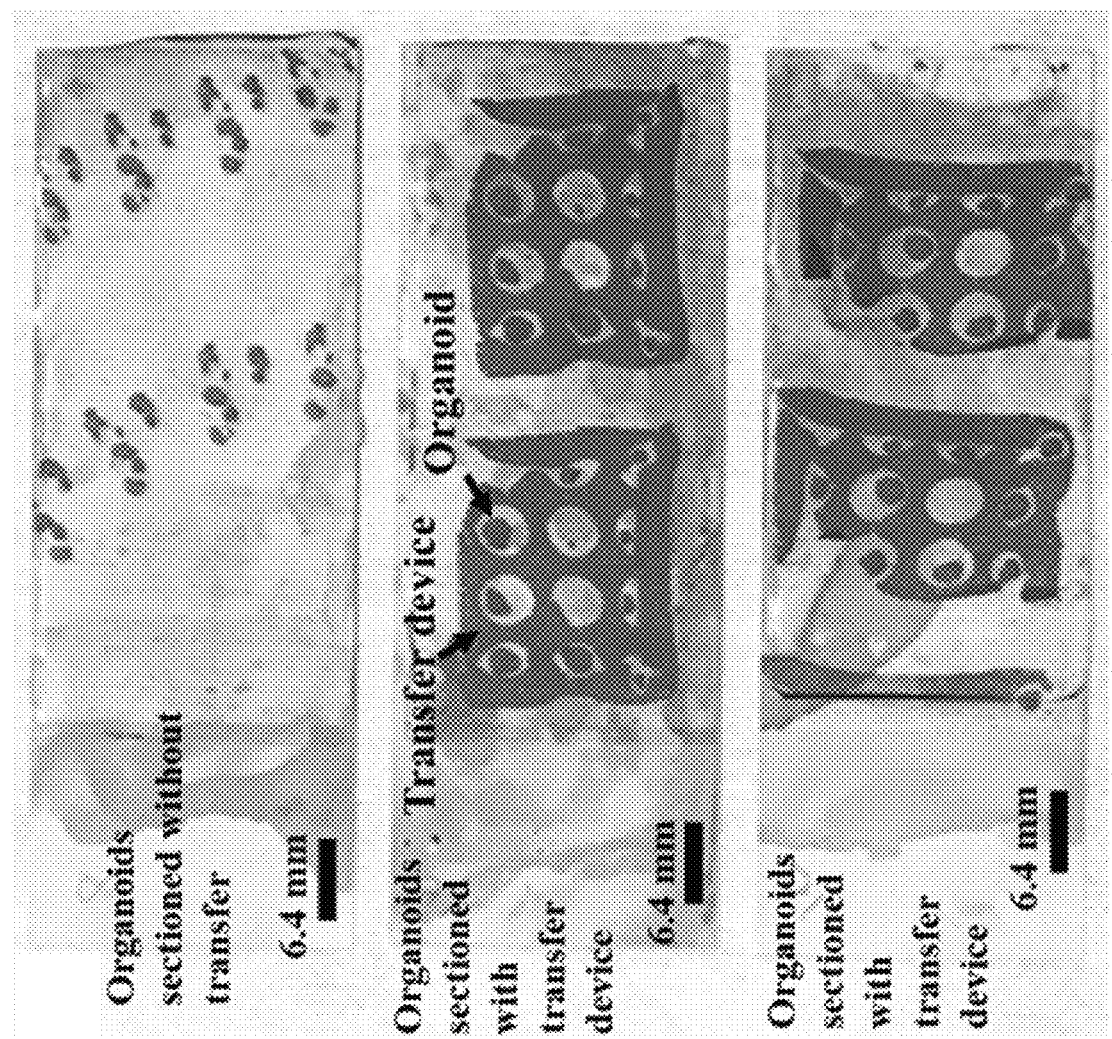
FIG. 4B is a set of images of the slides showing loosely embedded organoids (top) as well as those placed in pre-formed gels in a horizontal (middle) as well as vertical (bottom) orientation. Scale bars=6.4 mm.

Evaluation of histological processing of organoids with the hydrogels using cerebral organoids generated from human induced pluripotent stem cells (hiPSCs) was completed to determine the effect of the material on organoid analysis. Loose or hydrogel embedded organoids subjected to standard tissue processing cycles and embedded in paraffin blocks were compared to determine the performance of the material during histological processing and the effects on tissue analysis. The organoids were fixed using 4% paraformaldehyde (PFA), manually transferred to the wells of the pre-formed hydrogels, and subjected to increased temperature (65° C.) for 60 min to contract the gels, before placement of the entire construct inside a tissue processing cassette (FIGS. 4A-B). A subset of organoids was loosely placed inside a separate tissue processing cassette as a histological control. Controls were not exposed to temperature change prior to processing.

Figure 5A:
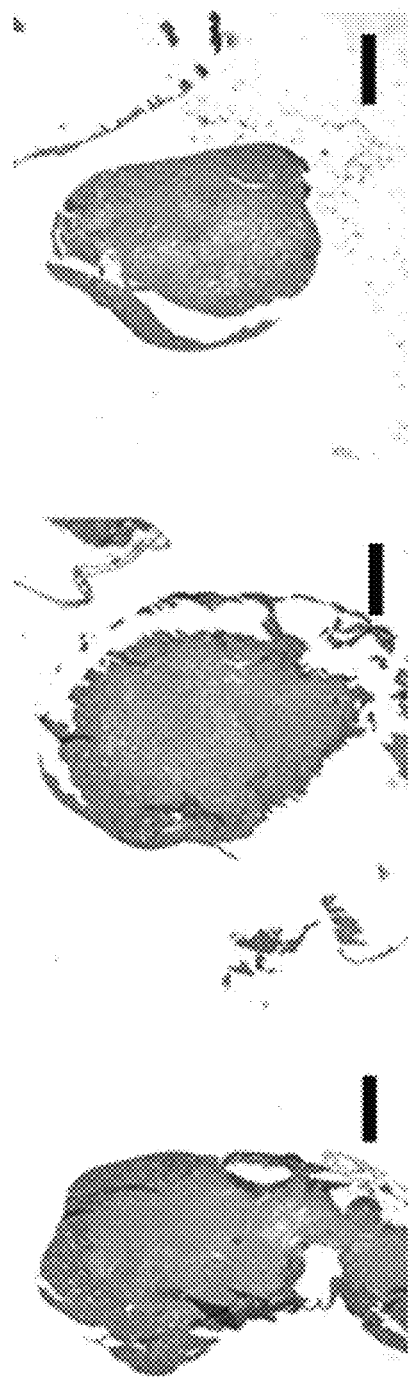
FIG. 5A includes histological staining images of cerebral organoids. Hematoxylin and eosin (H&E) staining of organoid tissue sections processed as loosely distributed singular organoids within tissue cassettes are shown. Three representative organoid tissue sections are shown. Scale bars=500 µm.
Figure 5B:
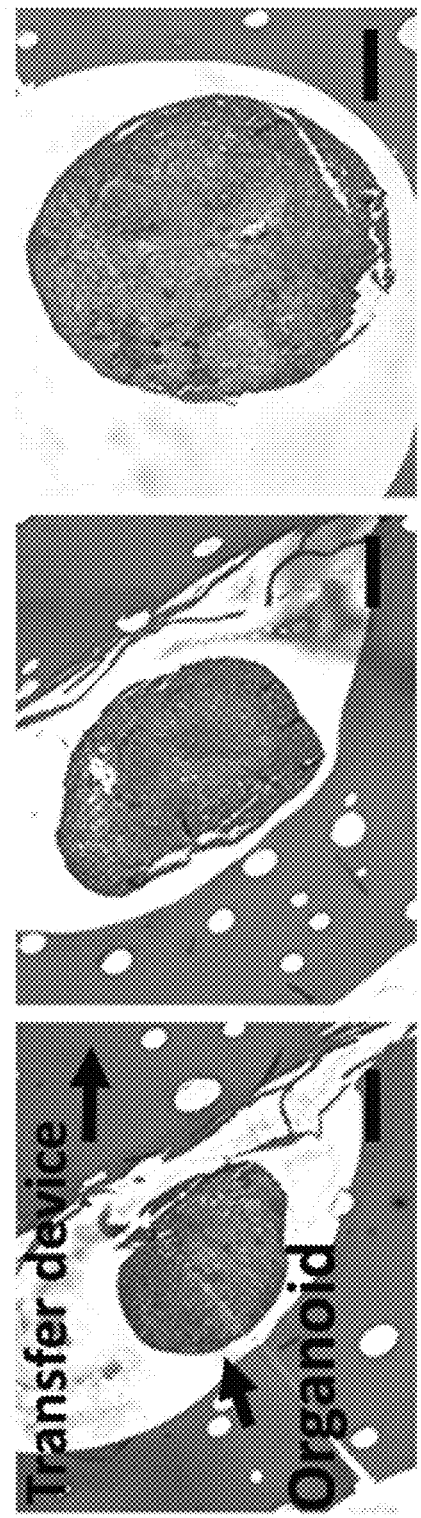
FIG. 5B includes histological staining images of cerebral organoids. H&E staining of organoid tissue sections processed in SELP hydrogels are shown. Three representative organoid tissue sections are shown. Scale bars=500 µm.

Organoids processed in the hydrogel molds and stained with hematoxylin & eosin (H&E) maintained an intact morphology and showed no apparent structural loss or damage as compared to organoids freely placed inside the tissue processing cassette. Further, the SELP embedded organoids appear to maintain more defined edges, present fewer tears, and show more compact tissue organization (FIGS. 5A-B).

Figure 6A:
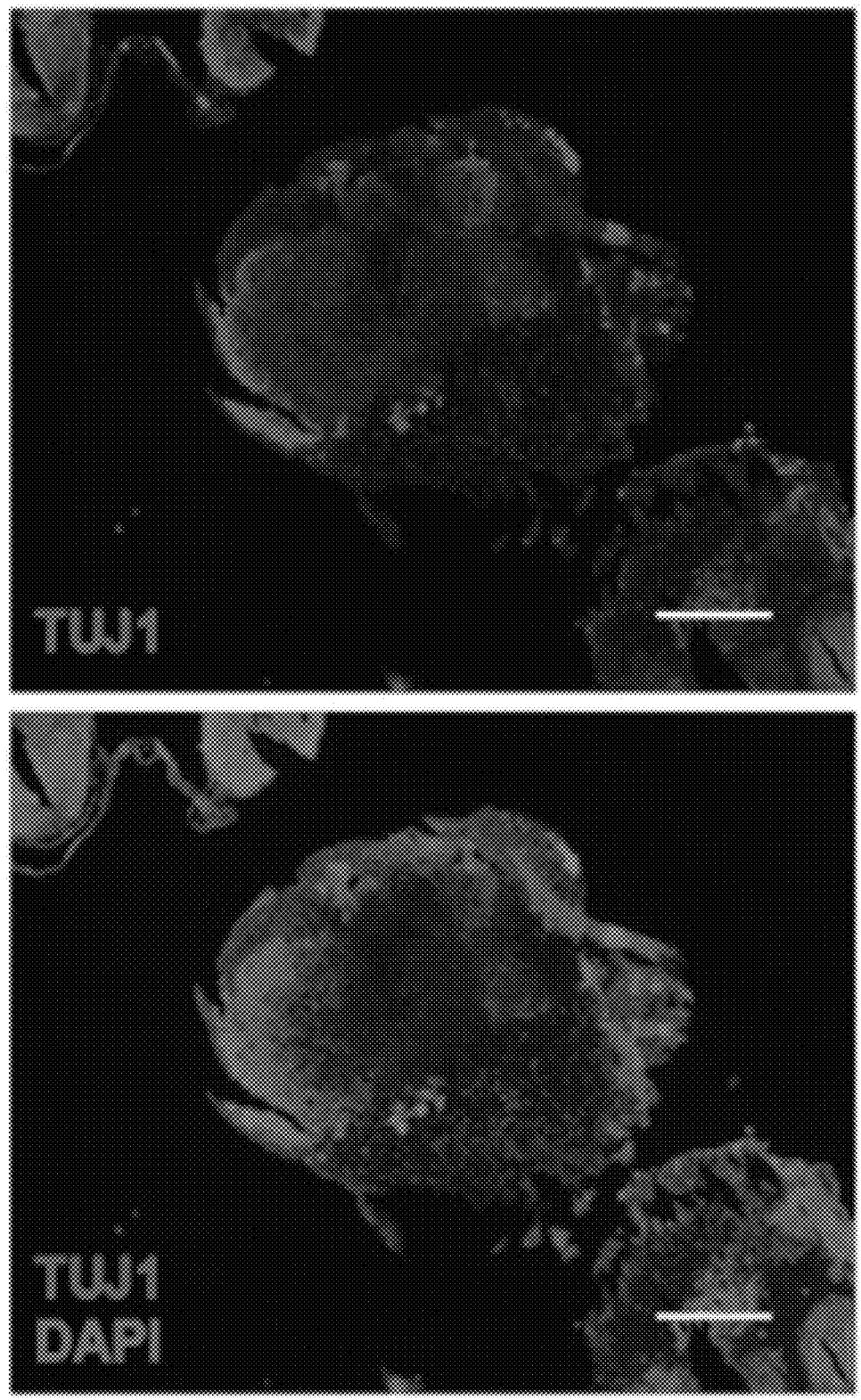
FIG. 6A includes immunofluorescent staining images of cerebral organoids. TUJ1 staining of organoid tissue sections processed as loosely distributed singular organoids within tissue cassettes are shown. Scale bars=500 µm.
Figure 6B:
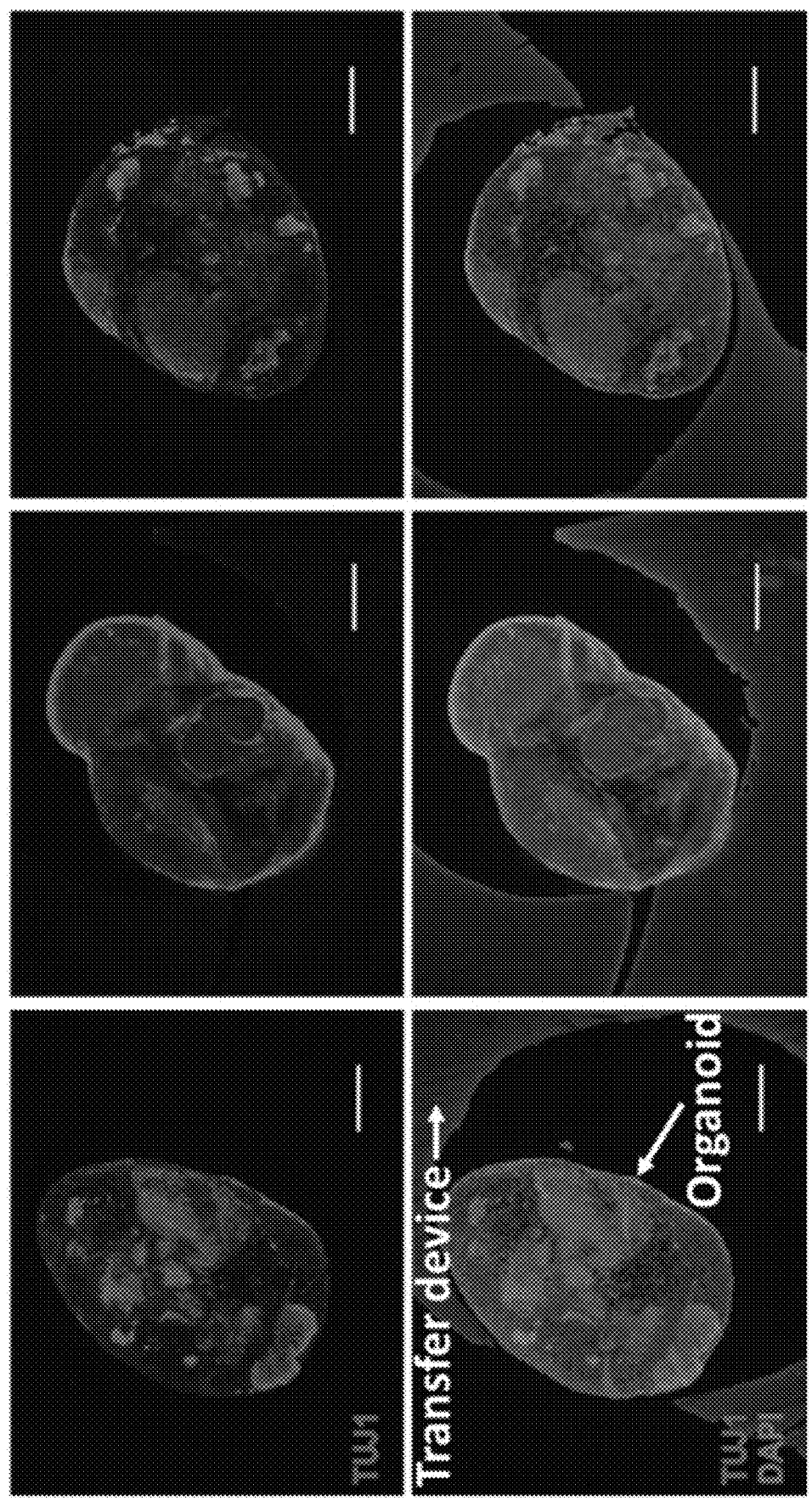
FIG. 6B includes immunofluorescent staining images of cerebral organoids. TUJ1 staining of organoid tissue sections processed in SELP hydrogels are shown. Three representative organoid tissue sections are shown. Scale bars=500 µm.

Further, embedding of cerebral organoid tissues in the hydrogel also showed no observable effects on immunostaining (FIGS. 6A-B). Fluorescent images of immunostaining using anti-beta-tubulin III antibody (TUJ1) show no morphological differences in immunostaining results for loose or embedded organoids. Throughout the tissue processing and embedding procedures, organoids remained in place in the hydrogel and the resulting material could be sectioned using a microtome to obtain paraffin sections 8-10 μm in thickness. Immunostained tissue sections demonstrated reproducibility and consistent results across multiple samples as seen in tissue morphology, histological analysis, and immunostaining results. As the immunostaining procedure involves several steps that could potentially damage the SELP materials (e.g., antigen retrieval,microwaving) these data indicate that the material is robust enough to withstand the harsh processing conditions. Thus, histological evaluation using cerebral organoids indicated no significant differences in processing results between the controls (loosely processed) or the arrayed, hydrogel processed organoids. H&E and immunological staining of both sets of organoids were consistent with expected results, suggesting that use of the hydrogel has no undesirable effects on the histological evaluation or downstream analysis.

The engineering of a SELP hydrogel arrays with thermo-responsive properties and utility for efficient cerebral organoid analysis was described. SELP-based hydrogel arrays fabricated using a 3×4 or 6×8 array of a 96 well plate designs can be used to generate robust, thermo-responsive hydrogel transfer devices for the simultaneous processing of 12 to 48 organoids. As a demonstration of the utility of the material, the cerebral organoids evaluated showed no effect of the material on histological processing. The results of the histology processing utilizing the SELP transfer material showed the potential of these protein-based systems for arrays of histological analysis of organoids. The SELP hydrogels maintained shape-change properties while showing no negative effect on subsequent organoid analysis. Further, the utility of the SELP devices results from the optimal design exploiting maximum material surface area, increasing throughput, and ensuring the fit of the organoids throughout processing. Future exploration of SELP constructs can be considered to develop materials for use on a larger scale, such as for clinical diagnostic screening of patient tissue samples.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

SEQUENCE LISTING

```
<160> NUMBER OF SEQ ID NOS: 4

<210> SEQ ID NO 1
<211> LENGTH: 7560
<212> TYPE: PRT
<213> ORGANISM: Artificial Sequence
<220> FEATURE:
<223> OTHER INFORMATION: synthetic construct
<220> FEATURE:
<221> NAME/KEY: MISC_FEATURE
<223> OTHER INFORMATION: This sequence has a formula of:
      ((GAGAGS)n(GVGVP)i(GXGVP)k(GVGVP)j)x, wherein a ratio of (i+j+k)
      to n is between 3:1 and 12:1, n is 1,2,or3, i is 0-35, k is 1, j
      is 0-36, i+j is 3-35, x is 5-20, and X is an amino acid other than
      valine.
<220> FEATURE:
<221> NAME/KEY: MISC_FEATURE
<223> OTHER INFORMATION: This sequence may encompass 1-3 'Gly Ala Gly
      Ala Gly Ser' repeating units, wherein some positions may be
      absent.
<220> FEATURE:
<221> NAME/KEY: MISC_FEATURE
<223> OTHER INFORMATION: This sequence may encompass 0-35 'Gly Val Gly
      Val Pro' repeating units, wherein some positions may be absent.
<220> FEATURE:
<221> NAME/KEY: MISC_FEATURE
<223> OTHER INFORMATION: This sequence may further encompass 0-36 'Gly
      Val Gly Val Pro' repeating units following the GXGVP unit, wherein
      some positions may be absent.
<220> FEATURE:
<221> NAME/KEY: MISC_FEATURE
<223> OTHER INFORMATION: See specification as filed for detailed
      description of substitutions and preferred embodiment
<220> FEATURE:
<221> NAME/KEY: misc_feature
<222> LOCATION: (195)..(195)
<223> OTHER INFORMATION: Xaa can be any naturally occurring amino acid
      other than valine
<220> FEATURE:
<221> NAME/KEY: misc_feature
<222> LOCATION: (573)..(573)
<223> OTHER INFORMATION: Xaa can be any naturally occurring amino acid
      other than valine
<220> FEATURE:
<221> NAME/KEY: misc_feature
<222> LOCATION: (951)..(951)
<223> OTHER INFORMATION: Xaa can be any naturally occurring amino acid
      other than valine
<220> FEATURE:
<221> NAME/KEY: misc_feature
<222> LOCATION: (1329)..(1329)
<223> OTHER INFORMATION: Xaa can be any naturally occurring amino acid
      other than valine
<220> FEATURE:
<221> NAME/KEY: misc_feature
<222> LOCATION: (1707)..(1707)
<223> OTHER INFORMATION: Xaa can be any naturally occurring amino acid
      other than valine
<220> FEATURE:
<221> NAME/KEY: misc_feature
<222> LOCATION: (2085)..(2085)
<223> OTHER INFORMATION: Xaa can be any naturally occurring amino acid
      other than valine
<220> FEATURE:
<221> NAME/KEY: misc_feature
```

```
<222> LOCATION: (2463)..(2463)
<223> OTHER INFORMATION: Xaa can be any naturally occurring amino acid
      other than valine
<220> FEATURE:
<221> NAME/KEY: misc_feature
<222> LOCATION: (2841)..(2841)
<223> OTHER INFORMATION: Xaa can be any naturally occurring amino acid
      other than valine
<220> FEATURE:
<221> NAME/KEY: misc_feature
<222> LOCATION: (3219)..(3219)
<223> OTHER INFORMATION: Xaa can be any naturally occurring amino acid
      other than valine
<220> FEATURE:
<221> NAME/KEY: misc_feature
<222> LOCATION: (3597)..(3597)
<223> OTHER INFORMATION: Xaa can be any naturally occurring amino acid
      other than valine
<220> FEATURE:
<221> NAME/KEY: misc_feature
<222> LOCATION: (3975)..(3975)
<223> OTHER INFORMATION: Xaa can be any naturally occurring amino acid
      other than valine
<220> FEATURE:
<221> NAME/KEY: misc_feature
<222> LOCATION: (4353)..(4353)
<223> OTHER INFORMATION: Xaa can be any naturally occurring amino acid
      other than valine
<220> FEATURE:
<221> NAME/KEY: misc_feature
<222> LOCATION: (4731)..(4731)
<223> OTHER INFORMATION: Xaa can be any naturally occurring amino acid
      other than valine
<220> FEATURE:
<221> NAME/KEY: misc_feature
<222> LOCATION: (5109)..(5109)
<223> OTHER INFORMATION: Xaa can be any naturally occurring amino acid
      other than valine
<220> FEATURE:
<221> NAME/KEY: misc_feature
<222> LOCATION: (5487)..(5487)
<223> OTHER INFORMATION: Xaa can be any naturally occurring amino acid
      other than valine
<220> FEATURE:
<221> NAME/KEY: misc_feature
<222> LOCATION: (5865)..(5865)
<223> OTHER INFORMATION: Xaa can be any naturally occurring amino acid
      other than valine
<220> FEATURE:
<221> NAME/KEY: misc_feature
<222> LOCATION: (6243)..(6243)
<223> OTHER INFORMATION: Xaa can be any naturally occurring amino acid
      other than valine
<220> FEATURE:
<221> NAME/KEY: misc_feature
<222> LOCATION: (6621)..(6621)
<223> OTHER INFORMATION: Xaa can be any naturally occurring amino acid
      other than valine
<220> FEATURE:
<221> NAME/KEY: misc_feature
<222> LOCATION: (6999)..(6999)
<223> OTHER INFORMATION: Xaa can be any naturally occurring amino acid
      other than valine
<220> FEATURE:
<221> NAME/KEY: misc_feature
<222> LOCATION: (7377)..(7377)
<223> OTHER INFORMATION: Xaa can be any naturally occurring amino acid
      other than valine

<400> SEQUENCE: 1

Gly Ala Gly Ala Gly Ser Gly Ala Gly Ala Gly Ser Gly Ala Gly Ala
1               5                   10                  15

Gly Ser Gly Val Gly Val Pro Gly Val Gly Val Pro Gly Val Gly Val
                20                  25                  30

Pro Gly Val Gly Val Pro Gly Val Gly Val Pro Gly Val Gly Val Pro
            35                  40                  45
```

```
Gly Val Gly Val Pro Gly Val Gly Val Pro Gly Val Gly Val Pro Gly
         50                  55                  60
Val Gly Val Pro Gly Val Gly Val Pro Gly Val Gly Val Pro Gly Val
 65                  70                  75                  80
Gly Val Pro Gly Val Gly Val Pro Gly Val Gly Val Pro Gly Val Gly
                 85                  90                  95
Val Pro Gly Val Gly Val Pro Gly Val Gly Val Pro Gly Val Gly Val
                100                 105                 110
Pro Gly Val Gly Val Pro Gly Val Gly Val Pro Gly Val Gly Val Pro
            115                 120                 125
Gly Val Gly Val Pro Gly Val Gly Val Pro Gly Val Gly Val Pro Gly
        130                 135                 140
Val Gly Val Pro Gly Val Gly Val Pro Gly Val Gly Val Pro Gly Val
145                 150                 155                 160
Gly Val Pro Gly Val Gly Val Pro Gly Val Gly Val Pro Gly Val Gly
                165                 170                 175
Val Pro Gly Val Gly Val Pro Gly Val Gly Val Pro Gly Val Gly Val
            180                 185                 190
Pro Gly Xaa Gly Val Pro Gly Val Gly Val Pro Gly Val Gly Val Pro
        195                 200                 205
Gly Val Gly Val Pro Gly Val Gly Val Pro Gly Val Gly Val Pro Gly
        210                 215                 220
Val Gly Val Pro Gly Val Gly Val Pro Gly Val Gly Val Pro Gly Val
225                 230                 235                 240
Gly Val Pro Gly Val Gly Val Pro Gly Val Gly Val Pro Gly Val Gly
                245                 250                 255
Val Pro Gly Val Gly Val Pro Gly Val Gly Val Pro Gly Val Gly Val
            260                 265                 270
Pro Gly Val Gly Val Pro Gly Val Gly Val Pro Gly Val Gly Val Pro
        275                 280                 285
Gly Val Gly Val Pro Gly Val Gly Val Pro Gly Val Gly Val Pro Gly
        290                 295                 300
Val Gly Val Pro Gly Val Gly Val Pro Gly Val Gly Val Pro Gly Val
305                 310                 315                 320
Gly Val Pro Gly Val Gly Val Pro Gly Val Gly Val Pro Gly Val Gly
                325                 330                 335
Val Pro Gly Val Gly Val Pro Gly Val Gly Val Pro Gly Val Gly Val
            340                 345                 350
Pro Gly Val Gly Val Pro Gly Val Gly Val Pro Gly Val Gly Val Pro
        355                 360                 365
Gly Val Gly Val Pro Gly Val Gly Val Pro Gly Ala Gly Ala Gly Ser
        370                 375                 380
Gly Ala Gly Ala Gly Ser Gly Ala Gly Ala Gly Ser Gly Val Gly Val
385                 390                 395                 400
Pro Gly Val Gly Val Pro Gly Val Gly Val Pro Gly Val Gly Val Pro
                405                 410                 415
Gly Val Gly Val Pro Gly Val Gly Val Pro Gly Val Gly Val Pro Gly
            420                 425                 430
Val Gly Val Pro Gly Val Gly Val Pro Gly Val Gly Val Pro Gly Val
        435                 440                 445
Gly Val Pro Gly Val Gly Val Pro Gly Val Gly Val Pro Gly Val Gly
        450                 455                 460
```

```
Val Pro Gly Val Gly Val Pro Gly Val Gly Val Pro Gly Val Gly Val
465                 470                 475                 480

Pro Gly Val Gly Val Pro Gly Val Gly Val Pro Gly Val Gly Val Pro
                485                 490                 495

Gly Val Gly Val Pro Gly Val Gly Val Pro Gly Val Gly Val Pro Gly
            500                 505                 510

Val Gly Val Pro Gly Val Gly Val Pro Gly Val Gly Val Pro Gly Val
        515                 520                 525

Gly Val Pro Gly Val Gly Val Pro Gly Val Gly Val Pro Gly Val Gly
    530                 535                 540

Val Pro Gly Val Gly Val Pro Gly Val Gly Val Pro Gly Val Gly Val
545                 550                 555                 560

Pro Gly Val Gly Val Pro Gly Val Gly Val Pro Gly Xaa Gly Val Pro
                565                 570                 575

Gly Val Gly Val Pro Gly Val Gly Val Pro Gly Val Gly Val Pro Gly
            580                 585                 590

Val Gly Val Pro Gly Val Gly Val Pro Gly Val Gly Val Pro Gly Val
        595                 600                 605

Gly Val Pro Gly Val Gly Val Pro Gly Val Gly Val Pro Gly Val Gly
    610                 615                 620

Val Pro Gly Val Gly Val Pro Gly Val Gly Val Pro Gly Val Gly Val
625                 630                 635                 640

Pro Gly Val Gly Val Pro Gly Val Gly Val Pro Gly Val Gly Val Pro
                645                 650                 655

Gly Val Gly Val Pro Gly Val Gly Val Pro Gly Val Gly Val Pro Gly
            660                 665                 670

Val Gly Val Pro Gly Val Gly Val Pro Gly Val Gly Val Pro Gly Val
        675                 680                 685

Gly Val Pro Gly Val Gly Val Pro Gly Val Gly Val Pro Gly Val Gly
    690                 695                 700

Val Pro Gly Val Gly Val Pro Gly Val Gly Val Pro Gly Val Gly Val
705                 710                 715                 720

Pro Gly Val Gly Val Pro Gly Val Gly Val Pro Gly Val Gly Val Pro
                725                 730                 735

Gly Val Gly Val Pro Gly Val Gly Val Pro Gly Val Gly Val Pro Gly
            740                 745                 750

Val Gly Val Pro Gly Ala Gly Ala Gly Ser Gly Ala Gly Ala Gly Ser
        755                 760                 765

Gly Ala Gly Ala Gly Ser Gly Val Gly Val Pro Gly Val Gly Val Pro
    770                 775                 780

Gly Val Gly Val Pro Gly Val Gly Val Pro Gly Val Gly Val Pro Gly
785                 790                 795                 800

Val Gly Val Pro Gly Val Gly Val Pro Gly Val Gly Val Pro Gly Val
                805                 810                 815

Gly Val Pro Gly Val Gly Val Pro Gly Val Gly Val Pro Gly Val Gly
            820                 825                 830

Val Pro Gly Val Gly Val Pro Gly Val Gly Val Pro Gly Val Gly Val
        835                 840                 845

Pro Gly Val Gly Val Pro Gly Val Gly Val Pro Gly Val Gly Val Pro
    850                 855                 860

Gly Val Gly Val Pro Gly Val Gly Val Pro Gly Val Gly Val Pro Gly
865                 870                 875                 880

Val Gly Val Pro Gly Val Gly Val Pro Gly Val Gly Val Pro Gly Val
```

```
                    885                 890                 895
Gly Val Pro Gly Val Gly Val Pro Gly Val Gly Val Pro Gly Val Gly
                900                 905                 910
Val Pro Gly Val Gly Val Pro Gly Val Gly Val Pro Gly Val Gly Val
                915                 920                 925
Pro Gly Val Gly Val Pro Gly Val Gly Val Pro Gly Val Gly Val Pro
                930                 935                 940
Gly Val Gly Val Pro Gly Xaa Gly Val Pro Gly Val Gly Val Pro Gly
945                 950                 955                 960
Val Gly Val Pro Gly Val Gly Val Pro Gly Val Gly Val Pro Gly Val
                965                 970                 975
Gly Val Pro Gly Val Gly Val Pro Gly Val Gly Val Pro Gly Val Gly
                980                 985                 990
Val Pro Gly Val Gly Val Pro Gly Val Gly Val Pro Gly Val Gly Val
                995                1000                1005
Pro Gly Val Gly Val Pro Gly Val Gly Val Pro Gly Val Gly Val
               1010                1015                1020
Pro Gly Val Gly Val Pro Gly Val Gly Val Pro Gly Val Gly Val
               1025                1030                1035
Pro Gly Val Gly Val Pro Gly Val Gly Val Pro Gly Val Gly Val
               1040                1045                1050
Pro Gly Val Gly Val Pro Gly Val Gly Val Pro Gly Val Gly Val
               1055                1060                1065
Pro Gly Val Gly Val Pro Gly Val Gly Val Pro Gly Val Gly Val
               1070                1075                1080
Pro Gly Val Gly Val Pro Gly Val Gly Val Pro Gly Val Gly Val
               1085                1090                1095
Pro Gly Val Gly Val Pro Gly Val Gly Val Pro Gly Val Gly Val
               1100                1105                1110
Pro Gly Val Gly Val Pro Gly Val Gly Val Pro Gly Val Gly Val
               1115                1120                1125
Pro Gly Val Gly Val Pro Gly Ala Gly Ala Gly Ser Gly Ala Gly
               1130                1135                1140
Ala Gly Ser Gly Ala Gly Ala Gly Ser Gly Val Gly Val Pro Gly
               1145                1150                1155
Val Gly Val Pro Gly Val Gly Val Pro Gly Val Gly Val Pro Gly
               1160                1165                1170
Val Gly Val Pro Gly Val Gly Val Pro Gly Val Gly Val Pro Gly
               1175                1180                1185
Val Gly Val Pro Gly Val Gly Val Pro Gly Val Gly Val Pro Gly
               1190                1195                1200
Val Gly Val Pro Gly Val Gly Val Pro Gly Val Gly Val Pro Gly
               1205                1210                1215
Val Gly Val Pro Gly Val Gly Val Pro Gly Val Gly Val Pro Gly
               1220                1225                1230
Val Gly Val Pro Gly Val Gly Val Pro Gly Val Gly Val Pro Gly
               1235                1240                1245
Val Gly Val Pro Gly Val Gly Val Pro Gly Val Gly Val Pro Gly
               1250                1255                1260
Val Gly Val Pro Gly Val Gly Val Pro Gly Val Gly Val Pro Gly
               1265                1270                1275
Val Gly Val Pro Gly Val Gly Val Pro Gly Val Gly Val Pro Gly
               1280                1285                1290
```

```
Val Gly Val Pro Gly Val Gly Val Pro Gly Val Gly Val Pro Gly
    1295            1300                1305

Val Gly Val Pro Gly Val Gly Val Pro Gly Val Gly Val Pro Gly
    1310            1315                1320

Val Gly Val Pro Gly Xaa Gly Val Pro Gly Val Gly Val Pro Gly
    1325            1330                1335

Val Gly Val Pro Gly Val Gly Val Pro Gly Val Gly Val Pro Gly
    1340            1345                1350

Val Gly Val Pro Gly Val Gly Val Pro Gly Val Gly Val Pro Gly
    1355            1360                1365

Val Gly Val Pro Gly Val Gly Val Pro Gly Val Gly Val Pro Gly
    1370            1375                1380

Val Gly Val Pro Gly Val Gly Val Pro Gly Val Gly Val Pro Gly
    1385            1390                1395

Val Gly Val Pro Gly Val Gly Val Pro Gly Val Gly Val Pro Gly
    1400            1405                1410

Val Gly Val Pro Gly Val Gly Val Pro Gly Val Gly Val Pro Gly
    1415            1420                1425

Val Gly Val Pro Gly Val Gly Val Pro Gly Val Gly Val Pro Gly
    1430            1435                1440

Val Gly Val Pro Gly Val Gly Val Pro Gly Val Gly Val Pro Gly
    1445            1450                1455

Val Gly Val Pro Gly Val Gly Val Pro Gly Val Gly Val Pro Gly
    1460            1465                1470

Val Gly Val Pro Gly Val Gly Val Pro Gly Val Gly Val Pro Gly
    1475            1480                1485

Val Gly Val Pro Gly Val Gly Val Pro Gly Val Gly Val Pro Gly
    1490            1495                1500

Val Gly Val Pro Gly Val Gly Val Pro Gly Ala Gly Ala Gly Ser
    1505            1510                1515

Gly Ala Gly Ala Gly Ser Gly Ala Gly Ala Gly Ser Gly Val Gly
    1520            1525                1530

Val Pro Gly Val Gly Val Pro Gly Val Gly Val Pro Gly Val Gly
    1535            1540                1545

Val Pro Gly Val Gly Val Pro Gly Val Gly Val Pro Gly Val Gly
    1550            1555                1560

Val Pro Gly Val Gly Val Pro Gly Val Gly Val Pro Gly Val Gly
    1565            1570                1575

Val Pro Gly Val Gly Val Pro Gly Val Gly Val Pro Gly Val Gly
    1580            1585                1590

Val Pro Gly Val Gly Val Pro Gly Val Gly Val Pro Gly Val Gly
    1595            1600                1605

Val Pro Gly Val Gly Val Pro Gly Val Gly Val Pro Gly Val Gly
    1610            1615                1620

Val Pro Gly Val Gly Val Pro Gly Val Gly Val Pro Gly Val Gly
    1625            1630                1635

Val Pro Gly Val Gly Val Pro Gly Val Gly Val Pro Gly Val Gly
    1640            1645                1650

Val Pro Gly Val Gly Val Pro Gly Val Gly Val Pro Gly Val Gly
    1655            1660                1665

Val Pro Gly Val Gly Val Pro Gly Val Gly Val Pro Gly Val Gly
    1670            1675                1680
```

Val Pro Gly Val Gly Val Pro Gly Val Gly Val Pro Gly Val Gly
1685                1690                1695

Val Pro Gly Val Gly Val Pro Gly Xaa Gly Val Pro Gly Val Gly
1700                1705                1710

Val Pro Gly Val Gly Val Pro Gly Val Gly Val Pro Gly Val Gly
1715                1720                1725

Val Pro Gly Val Gly Val Pro Gly Val Gly Val Pro Gly Val Gly
1730                1735                1740

Val Pro Gly Val Gly Val Pro Gly Val Gly Val Pro Gly Val Gly
1745                1750                1755

Val Pro Gly Val Gly Val Pro Gly Val Gly Val Pro Gly Val Gly
1760                1765                1770

Val Pro Gly Val Gly Val Pro Gly Val Gly Val Pro Gly Val Gly
1775                1780                1785

Val Pro Gly Val Gly Val Pro Gly Val Gly Val Pro Gly Val Gly
1790                1795                1800

Val Pro Gly Val Gly Val Pro Gly Val Gly Val Pro Gly Val Gly
1805                1810                1815

Val Pro Gly Val Gly Val Pro Gly Val Gly Val Pro Gly Val Gly
1820                1825                1830

Val Pro Gly Val Gly Val Pro Gly Val Gly Val Pro Gly Val Gly
1835                1840                1845

Val Pro Gly Val Gly Val Pro Gly Val Gly Val Pro Gly Val Gly
1850                1855                1860

Val Pro Gly Val Gly Val Pro Gly Val Gly Val Pro Gly Val Gly
1865                1870                1875

Val Pro Gly Val Gly Val Pro Gly Val Gly Val Pro Gly Ala Gly
1880                1885                1890

Ala Gly Ser Gly Ala Gly Ala Gly Ser Gly Ala Gly Ala Gly Ser
1895                1900                1905

Gly Val Gly Val Pro Gly Val Gly Val Pro Gly Val Gly Val Pro
1910                1915                1920

Gly Val Gly Val Pro Gly Val Gly Val Pro Gly Val Gly Val Pro
1925                1930                1935

Gly Val Gly Val Pro Gly Val Gly Val Pro Gly Val Gly Val Pro
1940                1945                1950

Gly Val Gly Val Pro Gly Val Gly Val Pro Gly Val Gly Val Pro
1955                1960                1965

Gly Val Gly Val Pro Gly Val Gly Val Pro Gly Val Gly Val Pro
1970                1975                1980

Gly Val Gly Val Pro Gly Val Gly Val Pro Gly Val Gly Val Pro
1985                1990                1995

Gly Val Gly Val Pro Gly Val Gly Val Pro Gly Val Gly Val Pro
2000                2005                2010

Gly Val Gly Val Pro Gly Val Gly Val Pro Gly Val Gly Val Pro
2015                2020                2025

Gly Val Gly Val Pro Gly Val Gly Val Pro Gly Val Gly Val Pro
2030                2035                2040

Gly Val Gly Val Pro Gly Val Gly Val Pro Gly Val Gly Val Pro
2045                2050                2055

Gly Val Gly Val Pro Gly Val Gly Val Pro Gly Val Gly Val Pro
2060                2065                2070

Gly Val Gly Val Pro Gly Val Gly Val Pro Gly Xaa Gly Val Pro

```
            2075                2080                2085

Gly Val Gly Val Pro Gly Val Gly Val Pro Gly Val Gly Val Pro
        2090                2095                2100

Gly Val Gly Val Pro Gly Val Gly Val Pro Gly Val Gly Val Pro
        2105                2110                2115

Gly Val Gly Val Pro Gly Val Gly Val Pro Gly Val Gly Val Pro
        2120                2125                2130

Gly Val Gly Val Pro Gly Val Gly Val Pro Gly Val Gly Val Pro
        2135                2140                2145

Gly Val Gly Val Pro Gly Val Gly Val Pro Gly Val Gly Val Pro
        2150                2155                2160

Gly Val Gly Val Pro Gly Val Gly Val Pro Gly Val Gly Val Pro
        2165                2170                2175

Gly Val Gly Val Pro Gly Val Gly Val Pro Gly Val Gly Val Pro
        2180                2185                2190

Gly Val Gly Val Pro Gly Val Gly Val Pro Gly Val Gly Val Pro
        2195                2200                2205

Gly Val Gly Val Pro Gly Val Gly Val Pro Gly Val Gly Val Pro
        2210                2215                2220

Gly Val Gly Val Pro Gly Val Gly Val Pro Gly Val Gly Val Pro
        2225                2230                2235

Gly Val Gly Val Pro Gly Val Gly Val Pro Gly Val Gly Val Pro
        2240                2245                2250

Gly Val Gly Val Pro Gly Val Gly Val Pro Gly Val Gly Val Pro
        2255                2260                2265

Gly Ala Gly Ala Gly Ser Gly Ala Gly Ala Ser Gly Ala Gly
        2270                2275                2280

Ala Gly Ser Gly Val Gly Val Pro Gly Val Gly Val Pro Gly Val
        2285                2290                2295

Gly Val Pro Gly Val Gly Val Pro Gly Val Gly Val Pro Gly Val
        2300                2305                2310

Gly Val Pro Gly Val Gly Val Pro Gly Val Gly Val Pro Gly Val
        2315                2320                2325

Gly Val Pro Gly Val Gly Val Pro Gly Val Gly Val Pro Gly Val
        2330                2335                2340

Gly Val Pro Gly Val Gly Val Pro Gly Val Gly Val Pro Gly Val
        2345                2350                2355

Gly Val Pro Gly Val Gly Val Pro Gly Val Gly Val Pro Gly Val
        2360                2365                2370

Gly Val Pro Gly Val Gly Val Pro Gly Val Gly Val Pro Gly Val
        2375                2380                2385

Gly Val Pro Gly Val Gly Val Pro Gly Val Gly Val Pro Gly Val
        2390                2395                2400

Gly Val Pro Gly Val Gly Val Pro Gly Val Gly Val Pro Gly Val
        2405                2410                2415

Gly Val Pro Gly Val Gly Val Pro Gly Val Gly Val Pro Gly Val
        2420                2425                2430

Gly Val Pro Gly Val Gly Val Pro Gly Val Gly Val Pro Gly Val
        2435                2440                2445

Gly Val Pro Gly Val Gly Val Pro Gly Val Gly Val Pro Gly Xaa
        2450                2455                2460

Gly Val Pro Gly Val Gly Val Pro Gly Val Gly Val Pro Gly Val
        2465                2470                2475
```

```
Gly Val Pro Gly Val Gly Val Pro Gly Val Gly Val Pro Gly Val
    2480            2485            2490

Gly Val Pro Gly Val Gly Val Pro Gly Val Gly Val Pro Gly Val
    2495            2500            2505

Gly Val Pro Gly Val Gly Val Pro Gly Val Gly Val Pro Gly Val
    2510            2515            2520

Gly Val Pro Gly Val Gly Val Pro Gly Val Gly Val Pro Gly Val
    2525            2530            2535

Gly Val Pro Gly Val Gly Val Pro Gly Val Gly Val Pro Gly Val
    2540            2545            2550

Gly Val Pro Gly Val Gly Val Pro Gly Val Gly Val Pro Gly Val
    2555            2560            2565

Gly Val Pro Gly Val Gly Val Pro Gly Val Gly Val Pro Gly Val
    2570            2575            2580

Gly Val Pro Gly Val Gly Val Pro Gly Val Gly Val Pro Gly Val
    2585            2590            2595

Gly Val Pro Gly Val Gly Val Pro Gly Val Gly Val Pro Gly Val
    2600            2605            2610

Gly Val Pro Gly Val Gly Val Pro Gly Val Gly Val Pro Gly Val
    2615            2620            2625

Gly Val Pro Gly Val Gly Val Pro Gly Val Gly Val Pro Gly Val
    2630            2635            2640

Gly Val Pro Gly Ala Gly Ala Gly Ser Gly Ala Gly Ala Gly Ser
    2645            2650            2655

Gly Ala Gly Ala Gly Ser Gly Val Gly Val Pro Gly Val Gly Val
    2660            2665            2670

Pro Gly Val Gly Val Pro Gly Val Gly Val Pro Gly Val Gly Val
    2675            2680            2685

Pro Gly Val Gly Val Pro Gly Val Gly Val Pro Gly Val Gly Val
    2690            2695            2700

Pro Gly Val Gly Val Pro Gly Val Gly Val Pro Gly Val Gly Val
    2705            2710            2715

Pro Gly Val Gly Val Pro Gly Val Gly Val Pro Gly Val Gly Val
    2720            2725            2730

Pro Gly Val Gly Val Pro Gly Val Gly Val Pro Gly Val Gly Val
    2735            2740            2745

Pro Gly Val Gly Val Pro Gly Val Gly Val Pro Gly Val Gly Val
    2750            2755            2760

Pro Gly Val Gly Val Pro Gly Val Gly Val Pro Gly Val Gly Val
    2765            2770            2775

Pro Gly Val Gly Val Pro Gly Val Gly Val Pro Gly Val Gly Val
    2780            2785            2790

Pro Gly Val Gly Val Pro Gly Val Gly Val Pro Gly Val Gly Val
    2795            2800            2805

Pro Gly Val Gly Val Pro Gly Val Gly Val Pro Gly Val Gly Val
    2810            2815            2820

Pro Gly Val Gly Val Pro Gly Val Gly Val Pro Gly Val Gly Val
    2825            2830            2835

Pro Gly Xaa Gly Val Pro Gly Val Gly Val Pro Gly Val Gly Val
    2840            2845            2850

Pro Gly Val Gly Val Pro Gly Val Gly Val Pro Gly Val Gly Val
    2855            2860            2865
```

-continued

Pro Gly Val Gly Val Pro Gly Val Gly Val Pro Gly Val Gly Val
    2870            2875            2880

Pro Gly Val Gly Val Pro Gly Val Gly Val Pro Gly Val Gly Val
    2885            2890            2895

Pro Gly Val Gly Val Pro Gly Val Gly Val Pro Gly Val Gly Val
    2900            2905            2910

Pro Gly Val Gly Val Pro Gly Val Gly Val Pro Gly Val Gly Val
    2915            2920            2925

Pro Gly Val Gly Val Pro Gly Val Gly Val Pro Gly Val Gly Val
    2930            2935            2940

Pro Gly Val Gly Val Pro Gly Val Gly Val Pro Gly Val Gly Val
    2945            2950            2955

Pro Gly Val Gly Val Pro Gly Val Gly Val Pro Gly Val Gly Val
    2960            2965            2970

Pro Gly Val Gly Val Pro Gly Val Gly Val Pro Gly Val Gly Val
    2975            2980            2985

Pro Gly Val Gly Val Pro Gly Val Gly Val Pro Gly Val Gly Val
    2990            2995            3000

Pro Gly Val Gly Val Pro Gly Val Gly Val Pro Gly Val Gly Val
    3005            3010            3015

Pro Gly Val Gly Val Pro Gly Ala Gly Ala Gly Ser Gly Ala Gly
    3020            3025            3030

Ala Gly Ser Gly Ala Gly Ala Gly Ser Gly Val Gly Val Pro Gly
    3035            3040            3045

Val Gly Val Pro Gly Val Gly Val Pro Gly Val Gly Val Pro Gly
    3050            3055            3060

Val Gly Val Pro Gly Val Gly Val Pro Gly Val Gly Val Pro Gly
    3065            3070            3075

Val Gly Val Pro Gly Val Gly Val Pro Gly Val Gly Val Pro Gly
    3080            3085            3090

Val Gly Val Pro Gly Val Gly Val Pro Gly Val Gly Val Pro Gly
    3095            3100            3105

Val Gly Val Pro Gly Val Gly Val Pro Gly Val Gly Val Pro Gly
    3110            3115            3120

Val Gly Val Pro Gly Val Gly Val Pro Gly Val Gly Val Pro Gly
    3125            3130            3135

Val Gly Val Pro Gly Val Gly Val Pro Gly Val Gly Val Pro Gly
    3140            3145            3150

Val Gly Val Pro Gly Val Gly Val Pro Gly Val Gly Val Pro Gly
    3155            3160            3165

Val Gly Val Pro Gly Val Gly Val Pro Gly Val Gly Val Pro Gly
    3170            3175            3180

Val Gly Val Pro Gly Val Gly Val Pro Gly Val Gly Val Pro Gly
    3185            3190            3195

Val Gly Val Pro Gly Val Gly Val Pro Gly Val Gly Val Pro Gly
    3200            3205            3210

Val Gly Val Pro Gly Xaa Gly Val Pro Gly Val Gly Val Pro Gly
    3215            3220            3225

Val Gly Val Pro Gly Val Gly Val Pro Gly Val Gly Val Pro Gly
    3230            3235            3240

Val Gly Val Pro Gly Val Gly Val Pro Gly Val Gly Val Pro Gly
    3245            3250            3255

Val Gly Val Pro Gly Val Gly Val Pro Gly Val Gly Val Pro Gly

-continued

```
            3260                3265                3270

Val Gly Val Pro Gly Val Gly  Val Pro Gly Val Gly  Val Pro Gly
    3275                3280                3285

Val Gly Val Pro Gly Val Gly  Val Pro Gly Val Gly  Val Pro Gly
    3290                3295                3300

Val Gly Val Pro Gly Val Gly  Val Pro Gly Val Gly  Val Pro Gly
    3305                3310                3315

Val Gly Val Pro Gly Val Gly  Val Pro Gly Val Gly  Val Pro Gly
    3320                3325                3330

Val Gly Val Pro Gly Val Gly  Val Pro Gly Val Gly  Val Pro Gly
    3335                3340                3345

Val Gly Val Pro Gly Val Gly  Val Pro Gly Val Gly  Val Pro Gly
    3350                3355                3360

Val Gly Val Pro Gly Val Gly  Val Pro Gly Val Gly  Val Pro Gly
    3365                3370                3375

Val Gly Val Pro Gly Val Gly  Val Pro Gly Val Gly  Val Pro Gly
    3380                3385                3390

Val Gly Val Pro Gly Val Gly  Val Pro Gly Ala Gly  Ala Gly Ser
    3395                3400                3405

Gly Ala Gly Ala Gly Ser Gly  Ala Gly Ala Gly Ser  Gly Val Gly
    3410                3415                3420

Val Pro Gly Val Gly Val Pro  Gly Val Gly Val Pro  Gly Val Gly
    3425                3430                3435

Val Pro Gly Val Gly Val Pro  Gly Val Gly Val Pro  Gly Val Gly
    3440                3445                3450

Val Pro Gly Val Gly Val Pro  Gly Val Gly Val Pro  Gly Val Gly
    3455                3460                3465

Val Pro Gly Val Gly Val Pro  Gly Val Gly Val Pro  Gly Val Gly
    3470                3475                3480

Val Pro Gly Val Gly Val Pro  Gly Val Gly Val Pro  Gly Val Gly
    3485                3490                3495

Val Pro Gly Val Gly Val Pro  Gly Val Gly Val Pro  Gly Val Gly
    3500                3505                3510

Val Pro Gly Val Gly Val Pro  Gly Val Gly Val Pro  Gly Val Gly
    3515                3520                3525

Val Pro Gly Val Gly Val Pro  Gly Val Gly Val Pro  Gly Val Gly
    3530                3535                3540

Val Pro Gly Val Gly Val Pro  Gly Val Gly Val Pro  Gly Val Gly
    3545                3550                3555

Val Pro Gly Val Gly Val Pro  Gly Val Gly Val Pro  Gly Val Gly
    3560                3565                3570

Val Pro Gly Val Gly Val Pro  Gly Val Gly Val Pro  Gly Val Gly
    3575                3580                3585

Val Pro Gly Val Gly Val Pro  Gly Xaa Gly Val Pro  Gly Val Gly
    3590                3595                3600

Val Pro Gly Val Gly Val Pro  Gly Val Gly Val Pro  Gly Val Gly
    3605                3610                3615

Val Pro Gly Val Gly Val Pro  Gly Val Gly Val Pro  Gly Val Gly
    3620                3625                3630

Val Pro Gly Val Gly Val Pro  Gly Val Gly Val Pro  Gly Val Gly
    3635                3640                3645

Val Pro Gly Val Gly Val Pro  Gly Val Gly Val Pro  Gly Val Gly
    3650                3655                3660
```

Val Pro Gly Val Gly Val Pro Gly Val Gly Val Pro Gly Val Gly
3665                3670                3675

Val Pro Gly Val Gly Val Pro Gly Val Gly Val Pro Gly Val Gly
3680                3685                3690

Val Pro Gly Val Gly Val Pro Gly Val Gly Val Pro Gly Val Gly
3695                3700                3705

Val Pro Gly Val Gly Val Pro Gly Val Gly Val Pro Gly Val Gly
3710                3715                3720

Val Pro Gly Val Gly Val Pro Gly Val Gly Val Pro Gly Val Gly
3725                3730                3735

Val Pro Gly Val Gly Val Pro Gly Val Gly Val Pro Gly Val Gly
3740                3745                3750

Val Pro Gly Val Gly Val Pro Gly Val Gly Val Pro Gly Val Gly
3755                3760                3765

Val Pro Gly Val Gly Val Pro Gly Val Gly Val Pro Gly Ala Gly
3770                3775                3780

Ala Gly Ser Gly Ala Gly Ala Gly Ser Gly Ala Gly Ala Gly Ser
3785                3790                3795

Gly Val Gly Val Pro Gly Val Gly Val Pro Gly Val Gly Val Pro
3800                3805                3810

Gly Val Gly Val Pro Gly Val Gly Val Pro Gly Val Gly Val Pro
3815                3820                3825

Gly Val Gly Val Pro Gly Val Gly Val Pro Gly Val Gly Val Pro
3830                3835                3840

Gly Val Gly Val Pro Gly Val Gly Val Pro Gly Val Gly Val Pro
3845                3850                3855

Gly Val Gly Val Pro Gly Val Gly Val Pro Gly Val Gly Val Pro
3860                3865                3870

Gly Val Gly Val Pro Gly Val Gly Val Pro Gly Val Gly Val Pro
3875                3880                3885

Gly Val Gly Val Pro Gly Val Gly Val Pro Gly Val Gly Val Pro
3890                3895                3900

Gly Val Gly Val Pro Gly Val Gly Val Pro Gly Val Gly Val Pro
3905                3910                3915

Gly Val Gly Val Pro Gly Val Gly Val Pro Gly Val Gly Val Pro
3920                3925                3930

Gly Val Gly Val Pro Gly Val Gly Val Pro Gly Val Gly Val Pro
3935                3940                3945

Gly Val Gly Val Pro Gly Val Gly Val Pro Gly Val Gly Val Pro
3950                3955                3960

Gly Val Gly Val Pro Gly Val Gly Val Pro Gly Xaa Gly Val Pro
3965                3970                3975

Gly Val Gly Val Pro Gly Val Gly Val Pro Gly Val Gly Val Pro
3980                3985                3990

Gly Val Gly Val Pro Gly Val Gly Val Pro Gly Val Gly Val Pro
3995                4000                4005

Gly Val Gly Val Pro Gly Val Gly Val Pro Gly Val Gly Val Pro
4010                4015                4020

Gly Val Gly Val Pro Gly Val Gly Val Pro Gly Val Gly Val Pro
4025                4030                4035

Gly Val Gly Val Pro Gly Val Gly Val Pro Gly Val Gly Val Pro
4040                4045                4050

```
Gly Val Gly Val Pro Gly Val Gly Val Pro Gly Val Pro
    4055            4060            4065

Gly Val Gly Val Pro Gly Val Gly Val Pro Gly Val Pro
    4070            4075            4080

Gly Val Gly Val Pro Gly Val Gly Val Pro Gly Val Pro
    4085            4090            4095

Gly Val Gly Val Pro Gly Val Gly Val Pro Gly Val Pro
    4100            4105            4110

Gly Val Gly Val Pro Gly Val Gly Val Pro Gly Val Pro
    4115            4120            4125

Gly Val Gly Val Pro Gly Val Gly Val Pro Gly Val Pro
    4130            4135            4140

Gly Val Gly Val Pro Gly Val Gly Val Pro Gly Val Pro
    4145            4150            4155

Gly Ala Gly Ala Gly Ser Gly Ala Gly Ala Ser Gly Ala Gly
    4160            4165            4170

Ala Gly Ser Gly Val Gly Val Pro Gly Val Gly Val Pro Gly Val
    4175            4180            4185

Gly Val Pro Gly Val Gly Val Pro Gly Val Gly Val Pro Gly Val
    4190            4195            4200

Gly Val Pro Gly Val Gly Val Pro Gly Val Gly Val Pro Gly Val
    4205            4210            4215

Gly Val Pro Gly Val Gly Val Pro Gly Val Gly Val Pro Gly Val
    4220            4225            4230

Gly Val Pro Gly Val Gly Val Pro Gly Val Gly Val Pro Gly Val
    4235            4240            4245

Gly Val Pro Gly Val Gly Val Pro Gly Val Gly Val Pro Gly Val
    4250            4255            4260

Gly Val Pro Gly Val Gly Val Pro Gly Val Gly Val Pro Gly Val
    4265            4270            4275

Gly Val Pro Gly Val Gly Val Pro Gly Val Gly Val Pro Gly Val
    4280            4285            4290

Gly Val Pro Gly Val Gly Val Pro Gly Val Gly Val Pro Gly Val
    4295            4300            4305

Gly Val Pro Gly Val Gly Val Pro Gly Val Gly Val Pro Gly Val
    4310            4315            4320

Gly Val Pro Gly Val Gly Val Pro Gly Val Gly Val Pro Gly Val
    4325            4330            4335

Gly Val Pro Gly Val Gly Val Pro Gly Val Gly Val Pro Gly Xaa
    4340            4345            4350

Gly Val Pro Gly Val Gly Val Pro Gly Val Gly Val Pro Gly Val
    4355            4360            4365

Gly Val Pro Gly Val Gly Val Pro Gly Val Gly Val Pro Gly Val
    4370            4375            4380

Gly Val Pro Gly Val Gly Val Pro Gly Val Gly Val Pro Gly Val
    4385            4390            4395

Gly Val Pro Gly Val Gly Val Pro Gly Val Gly Val Pro Gly Val
    4400            4405            4410

Gly Val Pro Gly Val Gly Val Pro Gly Val Gly Val Pro Gly Val
    4415            4420            4425

Gly Val Pro Gly Val Gly Val Pro Gly Val Gly Val Pro Gly Val
    4430            4435            4440

Gly Val Pro Gly Val Gly Val Pro Gly Val Gly Val Pro Gly Val
```

-continued

```
                4445                4450                4455

Gly Val Pro Gly Val Gly Val Pro Gly Val Gly Val Pro Gly Val
        4460                4465                4470

Gly Val Pro Gly Val Gly Val Pro Gly Val Gly Val Pro Gly Val
        4475                4480                4485

Gly Val Pro Gly Val Gly Val Pro Gly Val Gly Val Pro Gly Val
        4490                4495                4500

Gly Val Pro Gly Val Gly Val Pro Gly Val Gly Val Pro Gly Val
        4505                4510                4515

Gly Val Pro Gly Val Gly Val Pro Gly Val Gly Val Pro Gly Val
        4520                4525                4530

Gly Val Pro Gly Ala Gly Ala Gly Ser Gly Ala Gly Ala Gly Ser
        4535                4540                4545

Gly Ala Gly Ala Gly Ser Gly Val Gly Val Pro Gly Val Gly Val
        4550                4555                4560

Pro Gly Val Gly Val Pro Gly Val Gly Val Pro Gly Val Gly Val
        4565                4570                4575

Pro Gly Val Gly Val Pro Gly Val Gly Val Pro Gly Val Gly Val
        4580                4585                4590

Pro Gly Val Gly Val Pro Gly Val Gly Val Pro Gly Val Gly Val
        4595                4600                4605

Pro Gly Val Gly Val Pro Gly Val Gly Val Pro Gly Val Gly Val
        4610                4615                4620

Pro Gly Val Gly Val Pro Gly Val Gly Val Pro Gly Val Gly Val
        4625                4630                4635

Pro Gly Val Gly Val Pro Gly Val Gly Val Pro Gly Val Gly Val
        4640                4645                4650

Pro Gly Val Gly Val Pro Gly Val Gly Val Pro Gly Val Gly Val
        4655                4660                4665

Pro Gly Val Gly Val Pro Gly Val Gly Val Pro Gly Val Gly Val
        4670                4675                4680

Pro Gly Val Gly Val Pro Gly Val Gly Val Pro Gly Val Gly Val
        4685                4690                4695

Pro Gly Val Gly Val Pro Gly Val Gly Val Pro Gly Val Gly Val
        4700                4705                4710

Pro Gly Val Gly Val Pro Gly Val Gly Val Pro Gly Val Gly Val
        4715                4720                4725

Pro Gly Xaa Gly Val Pro Gly Val Gly Val Pro Gly Val Gly Val
        4730                4735                4740

Pro Gly Val Gly Val Pro Gly Val Gly Val Pro Gly Val Gly Val
        4745                4750                4755

Pro Gly Val Gly Val Pro Gly Val Gly Val Pro Gly Val Gly Val
        4760                4765                4770

Pro Gly Val Gly Val Pro Gly Val Gly Val Pro Gly Val Gly Val
        4775                4780                4785

Pro Gly Val Gly Val Pro Gly Val Gly Val Pro Gly Val Gly Val
        4790                4795                4800

Pro Gly Val Gly Val Pro Gly Val Gly Val Pro Gly Val Gly Val
        4805                4810                4815

Pro Gly Val Gly Val Pro Gly Val Gly Val Pro Gly Val Gly Val
        4820                4825                4830

Pro Gly Val Gly Val Pro Gly Val Gly Val Pro Gly Val Gly Val
        4835                4840                4845
```

-continued

Pro Gly Val Gly Val Pro Gly Val Gly Val Pro Gly Val Gly Val
    4850                4855            4860

Pro Gly Val Gly Val Pro Gly Val Gly Val Pro Gly Val Gly Val
    4865                4870            4875

Pro Gly Val Gly Val Pro Gly Val Gly Val Pro Gly Val Gly Val
    4880                4885            4890

Pro Gly Val Gly Val Pro Gly Val Gly Val Pro Gly Val Gly Val
    4895                4900            4905

Pro Gly Val Gly Val Pro Gly Ala Gly Ala Ser Gly Ala Gly
    4910                4915            4920

Ala Gly Ser Gly Ala Gly Ala Gly Ser Gly Val Gly Val Pro Gly
    4925                4930            4935

Val Gly Val Pro Gly Val Gly Val Pro Gly Val Gly Val Pro Gly
    4940                4945            4950

Val Gly Val Pro Gly Val Gly Val Pro Gly Val Gly Val Pro Gly
    4955                4960            4965

Val Gly Val Pro Gly Val Gly Val Pro Gly Val Gly Val Pro Gly
    4970                4975            4980

Val Gly Val Pro Gly Val Gly Val Pro Gly Val Gly Val Pro Gly
    4985                4990            4995

Val Gly Val Pro Gly Val Gly Val Pro Gly Val Gly Val Pro Gly
    5000                5005            5010

Val Gly Val Pro Gly Val Gly Val Pro Gly Val Gly Val Pro Gly
    5015                5020            5025

Val Gly Val Pro Gly Val Gly Val Pro Gly Val Gly Val Pro Gly
    5030                5035            5040

Val Gly Val Pro Gly Val Gly Val Pro Gly Val Gly Val Pro Gly
    5045                5050            5055

Val Gly Val Pro Gly Val Gly Val Pro Gly Val Gly Val Pro Gly
    5060                5065            5070

Val Gly Val Pro Gly Val Gly Val Pro Gly Val Gly Val Pro Gly
    5075                5080            5085

Val Gly Val Pro Gly Val Gly Val Pro Gly Val Gly Val Pro Gly
    5090                5095            5100

Val Gly Val Pro Gly Xaa Gly Val Pro Gly Val Gly Val Pro Gly
    5105                5110            5115

Val Gly Val Pro Gly Val Gly Val Pro Gly Val Gly Val Pro Gly
    5120                5125            5130

Val Gly Val Pro Gly Val Gly Val Pro Gly Val Gly Val Pro Gly
    5135                5140            5145

Val Gly Val Pro Gly Val Gly Val Pro Gly Val Gly Val Pro Gly
    5150                5155            5160

Val Gly Val Pro Gly Val Gly Val Pro Gly Val Gly Val Pro Gly
    5165                5170            5175

Val Gly Val Pro Gly Val Gly Val Pro Gly Val Gly Val Pro Gly
    5180                5185            5190

Val Gly Val Pro Gly Val Gly Val Pro Gly Val Gly Val Pro Gly
    5195                5200            5205

Val Gly Val Pro Gly Val Gly Val Pro Gly Val Gly Val Pro Gly
    5210                5215            5220

Val Gly Val Pro Gly Val Gly Val Pro Gly Val Gly Val Pro Gly
    5225                5230            5235

-continued

```
Val Gly  Val Pro Gly Val Gly  Val Pro Gly Val Gly  Val Pro Gly
    5240             5245              5250

Val Gly  Val Pro Gly Val Gly  Val Pro Gly Val Gly  Val Pro Gly
    5255             5260              5265

Val Gly  Val Pro Gly Val Gly  Val Pro Gly Val Gly  Val Pro Gly
    5270             5275              5280

Val Gly  Val Pro Gly Val Gly  Val Pro Gly Ala Gly  Ala Gly Ser
    5285             5290              5295

Gly Ala  Gly Ala Gly Ser Gly  Ala Gly Ala Gly Ser  Gly Val Gly
    5300             5305              5310

Val Pro  Gly Val Gly Val Pro  Gly Val Gly Val Pro  Gly Val Gly
    5315             5320              5325

Val Pro  Gly Val Gly Val Pro  Gly Val Gly Val Pro  Gly Val Gly
    5330             5335              5340

Val Pro  Gly Val Gly Val Pro  Gly Val Gly Val Pro  Gly Val Gly
    5345             5350              5355

Val Pro  Gly Val Gly Val Pro  Gly Val Gly Val Pro  Gly Val Gly
    5360             5365              5370

Val Pro  Gly Val Gly Val Pro  Gly Val Gly Val Pro  Gly Val Gly
    5375             5380              5385

Val Pro  Gly Val Gly Val Pro  Gly Val Gly Val Pro  Gly Val Gly
    5390             5395              5400

Val Pro  Gly Val Gly Val Pro  Gly Val Gly Val Pro  Gly Val Gly
    5405             5410              5415

Val Pro  Gly Val Gly Val Pro  Gly Val Gly Val Pro  Gly Val Gly
    5420             5425              5430

Val Pro  Gly Val Gly Val Pro  Gly Val Gly Val Pro  Gly Val Gly
    5435             5440              5445

Val Pro  Gly Val Gly Val Pro  Gly Val Gly Val Pro  Gly Val Gly
    5450             5455              5460

Val Pro  Gly Val Gly Val Pro  Gly Val Gly Val Pro  Gly Val Gly
    5465             5470              5475

Val Pro  Gly Val Gly Val Pro  Gly Xaa Gly Val Pro  Gly Val Gly
    5480             5485              5490

Val Pro  Gly Val Gly Val Pro  Gly Val Gly Val Pro  Gly Val Gly
    5495             5500              5505

Val Pro  Gly Val Gly Val Pro  Gly Val Gly Val Pro  Gly Val Gly
    5510             5515              5520

Val Pro  Gly Val Gly Val Pro  Gly Val Gly Val Pro  Gly Val Gly
    5525             5530              5535

Val Pro  Gly Val Gly Val Pro  Gly Val Gly Val Pro  Gly Val Gly
    5540             5545              5550

Val Pro  Gly Val Gly Val Pro  Gly Val Gly Val Pro  Gly Val Gly
    5555             5560              5565

Val Pro  Gly Val Gly Val Pro  Gly Val Gly Val Pro  Gly Val Gly
    5570             5575              5580

Val Pro  Gly Val Gly Val Pro  Gly Val Gly Val Pro  Gly Val Gly
    5585             5590              5595

Val Pro  Gly Val Gly Val Pro  Gly Val Gly Val Pro  Gly Val Gly
    5600             5605              5610

Val Pro  Gly Val Gly Val Pro  Gly Val Gly Val Pro  Gly Val Gly
    5615             5620              5625

Val Pro  Gly Val Gly Val Pro  Gly Val Gly Val Pro  Gly Val Gly
```

-continued

```
            5630                5635                5640

Val Pro Gly Val Gly Val Pro Gly Val Gly Val Pro  Gly Val Gly
            5645                5650                5655

Val Pro Gly Val Gly Val Pro Gly Val Gly Val Pro  Gly Ala Gly
            5660                5665                5670

Ala Gly Ser Gly Ala Gly Ala Gly Ser Gly Ala Gly  Ala Gly Ser
            5675                5680                5685

Gly Val Gly Val Pro Gly Val Gly Val Pro Gly Val  Gly Val Pro
            5690                5695                5700

Gly Val Gly Val Pro Gly Val Gly Val Pro Gly Val  Gly Val Pro
            5705                5710                5715

Gly Val Gly Val Pro Gly Val Gly Val Pro Gly Val  Gly Val Pro
            5720                5725                5730

Gly Val Gly Val Pro Gly Val Gly Val Pro Gly Val  Gly Val Pro
            5735                5740                5745

Gly Val Gly Val Pro Gly Val Gly Val Pro Gly Val  Gly Val Pro
            5750                5755                5760

Gly Val Gly Val Pro Gly Val Gly Val Pro Gly Val  Gly Val Pro
            5765                5770                5775

Gly Val Gly Val Pro Gly Val Gly Val Pro Gly Val  Gly Val Pro
            5780                5785                5790

Gly Val Gly Val Pro Gly Val Gly Val Pro Gly Val  Gly Val Pro
            5795                5800                5805

Gly Val Gly Val Pro Gly Val Gly Val Pro Gly Val  Gly Val Pro
            5810                5815                5820

Gly Val Gly Val Pro Gly Val Gly Val Pro Gly Val  Gly Val Pro
            5825                5830                5835

Gly Val Gly Val Pro Gly Val Gly Val Pro Gly Val  Gly Val Pro
            5840                5845                5850

Gly Val Gly Val Pro Gly Val Gly Val Pro Gly Xaa  Gly Val Pro
            5855                5860                5865

Gly Val Gly Val Pro Gly Val Gly Val Pro Gly Val  Gly Val Pro
            5870                5875                5880

Gly Val Gly Val Pro Gly Val Gly Val Pro Gly Val  Gly Val Pro
            5885                5890                5895

Gly Val Gly Val Pro Gly Val Gly Val Pro Gly Val  Gly Val Pro
            5900                5905                5910

Gly Val Gly Val Pro Gly Val Gly Val Pro Gly Val  Gly Val Pro
            5915                5920                5925

Gly Val Gly Val Pro Gly Val Gly Val Pro Gly Val  Gly Val Pro
            5930                5935                5940

Gly Val Gly Val Pro Gly Val Gly Val Pro Gly Val  Gly Val Pro
            5945                5950                5955

Gly Val Gly Val Pro Gly Val Gly Val Pro Gly Val  Gly Val Pro
            5960                5965                5970

Gly Val Gly Val Pro Gly Val Gly Val Pro Gly Val  Gly Val Pro
            5975                5980                5985

Gly Val Gly Val Pro Gly Val Gly Val Pro Gly Val  Gly Val Pro
            5990                5995                6000

Gly Val Gly Val Pro Gly Val Gly Val Pro Gly Val  Gly Val Pro
            6005                6010                6015

Gly Val Gly Val Pro Gly Val Gly Val Pro Gly Val  Gly Val Pro
            6020                6025                6030
```

```
Gly Val Gly Val Pro Gly Val Gly Val Pro Gly Val Pro
    6035                6040                6045

Gly Ala Gly Ala Gly Ser Gly Ala Gly Ala Gly Ser Gly Ala Gly
    6050                6055                6060

Ala Gly Ser Gly Val Gly Val Pro Gly Val Gly Val Pro Gly Val
    6065                6070                6075

Gly Val Pro Gly Val Gly Val Pro Gly Val Gly Val Pro Gly Val
    6080                6085                6090

Gly Val Pro Gly Val Gly Val Pro Gly Val Gly Val Pro Gly Val
    6095                6100                6105

Gly Val Pro Gly Val Gly Val Pro Gly Val Gly Val Pro Gly Val
    6110                6115                6120

Gly Val Pro Gly Val Gly Val Pro Gly Val Gly Val Pro Gly Val
    6125                6130                6135

Gly Val Pro Gly Val Gly Val Pro Gly Val Gly Val Pro Gly Val
    6140                6145                6150

Gly Val Pro Gly Val Gly Val Pro Gly Val Gly Val Pro Gly Val
    6155                6160                6165

Gly Val Pro Gly Val Gly Val Pro Gly Val Gly Val Pro Gly Val
    6170                6175                6180

Gly Val Pro Gly Val Gly Val Pro Gly Val Gly Val Pro Gly Val
    6185                6190                6195

Gly Val Pro Gly Val Gly Val Pro Gly Val Gly Val Pro Gly Val
    6200                6205                6210

Gly Val Pro Gly Val Gly Val Pro Gly Val Gly Val Pro Gly Val
    6215                6220                6225

Gly Val Pro Gly Val Gly Val Pro Gly Val Gly Val Pro Gly Xaa
    6230                6235                6240

Gly Val Pro Gly Val Gly Val Pro Gly Val Gly Val Pro Gly Val
    6245                6250                6255

Gly Val Pro Gly Val Gly Val Pro Gly Val Gly Val Pro Gly Val
    6260                6265                6270

Gly Val Pro Gly Val Gly Val Pro Gly Val Gly Val Pro Gly Val
    6275                6280                6285

Gly Val Pro Gly Val Gly Val Pro Gly Val Gly Val Pro Gly Val
    6290                6295                6300

Gly Val Pro Gly Val Gly Val Pro Gly Val Gly Val Pro Gly Val
    6305                6310                6315

Gly Val Pro Gly Val Gly Val Pro Gly Val Gly Val Pro Gly Val
    6320                6325                6330

Gly Val Pro Gly Val Gly Val Pro Gly Val Gly Val Pro Gly Val
    6335                6340                6345

Gly Val Pro Gly Val Gly Val Pro Gly Val Gly Val Pro Gly Val
    6350                6355                6360

Gly Val Pro Gly Val Gly Val Pro Gly Val Gly Val Pro Gly Val
    6365                6370                6375

Gly Val Pro Gly Val Gly Val Pro Gly Val Gly Val Pro Gly Val
    6380                6385                6390

Gly Val Pro Gly Val Gly Val Pro Gly Val Gly Val Pro Gly Val
    6395                6400                6405

Gly Val Pro Gly Val Gly Val Pro Gly Val Gly Val Pro Gly Val
    6410                6415                6420
```

-continued

Gly Val Pro Gly Ala Gly Ala Gly Ser Gly Ala Gly Ala Gly Ser
    6425                6430                6435

Gly Ala Gly Ala Gly Ser Gly Val Gly Val Pro Gly Val Gly Val
    6440                6445                6450

Pro Gly Val Gly Val Pro Gly Val Gly Val Pro Gly Val Gly Val
    6455                6460                6465

Pro Gly Val Gly Val Pro Gly Val Gly Val Pro Gly Val Gly Val
    6470                6475                6480

Pro Gly Val Gly Val Pro Gly Val Gly Val Pro Gly Val Gly Val
    6485                6490                6495

Pro Gly Val Gly Val Pro Gly Val Gly Val Pro Gly Val Gly Val
    6500                6505                6510

Pro Gly Val Gly Val Pro Gly Val Gly Val Pro Gly Val Gly Val
    6515                6520                6525

Pro Gly Val Gly Val Pro Gly Val Gly Val Pro Gly Val Gly Val
    6530                6535                6540

Pro Gly Val Gly Val Pro Gly Val Gly Val Pro Gly Val Gly Val
    6545                6550                6555

Pro Gly Val Gly Val Pro Gly Val Gly Val Pro Gly Val Gly Val
    6560                6565                6570

Pro Gly Val Gly Val Pro Gly Val Gly Val Pro Gly Val Gly Val
    6575                6580                6585

Pro Gly Val Gly Val Pro Gly Val Gly Val Pro Gly Val Gly Val
    6590                6595                6600

Pro Gly Val Gly Val Pro Gly Val Gly Val Pro Gly Val Gly Val
    6605                6610                6615

Pro Gly Xaa Gly Val Pro Gly Val Gly Val Pro Gly Val Gly Val
    6620                6625                6630

Pro Gly Val Gly Val Pro Gly Val Gly Val Pro Gly Val Gly Val
    6635                6640                6645

Pro Gly Val Gly Val Pro Gly Val Gly Val Pro Gly Val Gly Val
    6650                6655                6660

Pro Gly Val Gly Val Pro Gly Val Gly Val Pro Gly Val Gly Val
    6665                6670                6675

Pro Gly Val Gly Val Pro Gly Val Gly Val Pro Gly Val Gly Val
    6680                6685                6690

Pro Gly Val Gly Val Pro Gly Val Gly Val Pro Gly Val Gly Val
    6695                6700                6705

Pro Gly Val Gly Val Pro Gly Val Gly Val Pro Gly Val Gly Val
    6710                6715                6720

Pro Gly Val Gly Val Pro Gly Val Gly Val Pro Gly Val Gly Val
    6725                6730                6735

Pro Gly Val Gly Val Pro Gly Val Gly Val Pro Gly Val Gly Val
    6740                6745                6750

Pro Gly Val Gly Val Pro Gly Val Gly Val Pro Gly Val Gly Val
    6755                6760                6765

Pro Gly Val Gly Val Pro Gly Val Gly Val Pro Gly Val Gly Val
    6770                6775                6780

Pro Gly Val Gly Val Pro Gly Val Gly Val Pro Gly Val Gly Val
    6785                6790                6795

Pro Gly Val Gly Val Pro Gly Ala Gly Ala Gly Ser Gly Ala Gly
    6800                6805                6810

Ala Gly Ser Gly Ala Gly Ala Gly Ser Gly Val Gly Val Pro Gly

-continued

```
            6815                6820                6825

Val Gly Val Pro Gly Val Gly Val Pro Gly Val Gly Val Pro Gly
            6830                6835                6840

Val Gly Val Pro Gly Val Gly Val Pro Gly Val Gly Val Pro Gly
            6845                6850                6855

Val Gly Val Pro Gly Val Gly Val Pro Gly Val Gly Val Pro Gly
            6860                6865                6870

Val Gly Val Pro Gly Val Gly Val Pro Gly Val Gly Val Pro Gly
            6875                6880                6885

Val Gly Val Pro Gly Val Gly Val Pro Gly Val Gly Val Pro Gly
            6890                6895                6900

Val Gly Val Pro Gly Val Gly Val Pro Gly Val Gly Val Pro Gly
            6905                6910                6915

Val Gly Val Pro Gly Val Gly Val Pro Gly Val Gly Val Pro Gly
            6920                6925                6930

Val Gly Val Pro Gly Val Gly Val Pro Gly Val Gly Val Pro Gly
            6935                6940                6945

Val Gly Val Pro Gly Val Gly Val Pro Gly Val Gly Val Pro Gly
            6950                6955                6960

Val Gly Val Pro Gly Val Gly Val Pro Gly Val Gly Val Pro Gly
            6965                6970                6975

Val Gly Val Pro Gly Val Gly Val Pro Gly Val Gly Val Pro Gly
            6980                6985                6990

Val Gly Val Pro Gly Xaa Gly Val Pro Gly Val Gly Val Pro Gly
            6995                7000                7005

Val Gly Val Pro Gly Val Gly Val Pro Gly Val Gly Val Pro Gly
            7010                7015                7020

Val Gly Val Pro Gly Val Gly Val Pro Gly Val Gly Val Pro Gly
            7025                7030                7035

Val Gly Val Pro Gly Val Gly Val Pro Gly Val Gly Val Pro Gly
            7040                7045                7050

Val Gly Val Pro Gly Val Gly Val Pro Gly Val Gly Val Pro Gly
            7055                7060                7065

Val Gly Val Pro Gly Val Gly Val Pro Gly Val Gly Val Pro Gly
            7070                7075                7080

Val Gly Val Pro Gly Val Gly Val Pro Gly Val Gly Val Pro Gly
            7085                7090                7095

Val Gly Val Pro Gly Val Gly Val Pro Gly Val Gly Val Pro Gly
            7100                7105                7110

Val Gly Val Pro Gly Val Gly Val Pro Gly Val Gly Val Pro Gly
            7115                7120                7125

Val Gly Val Pro Gly Val Gly Val Pro Gly Val Gly Val Pro Gly
            7130                7135                7140

Val Gly Val Pro Gly Val Gly Val Pro Gly Val Gly Val Pro Gly
            7145                7150                7155

Val Gly Val Pro Gly Val Gly Val Pro Gly Val Gly Val Pro Gly
            7160                7165                7170

Val Gly Val Pro Gly Val Gly Val Pro Gly Ala Gly Ala Gly Ser
            7175                7180                7185

Gly Ala Gly Ala Gly Ser Gly Ala Gly Ala Gly Ser Gly Val Gly
            7190                7195                7200

Val Pro Gly Val Gly Val Pro Gly Val Gly Val Pro Gly Val Gly
            7205                7210                7215
```

Val Pro Gly Val Gly Val Pro Gly Val Gly Val Pro Gly Val Gly
7220                7225                7230

Val Pro Gly Val Gly Val Pro Gly Val Gly Val Pro Gly Val Gly
7235                7240                7245

Val Pro Gly Val Gly Val Pro Gly Val Gly Val Pro Gly Val Gly
7250                7255                7260

Val Pro Gly Val Gly Val Pro Gly Val Gly Val Pro Gly Val Gly
7265                7270                7275

Val Pro Gly Val Gly Val Pro Gly Val Gly Val Pro Gly Val Gly
7280                7285                7290

Val Pro Gly Val Gly Val Pro Gly Val Gly Val Pro Gly Val Gly
7295                7300                7305

Val Pro Gly Val Gly Val Pro Gly Val Gly Val Pro Gly Val Gly
7310                7315                7320

Val Pro Gly Val Gly Val Pro Gly Val Gly Val Pro Gly Val Gly
7325                7330                7335

Val Pro Gly Val Gly Val Pro Gly Val Gly Val Pro Gly Val Gly
7340                7345                7350

Val Pro Gly Val Gly Val Pro Gly Val Gly Val Pro Gly Val Gly
7355                7360                7365

Val Pro Gly Val Gly Val Pro Gly Xaa Gly Val Pro Gly Val Gly
7370                7375                7380

Val Pro Gly Val Gly Val Pro Gly Val Gly Val Pro Gly Val Gly
7385                7390                7395

Val Pro Gly Val Gly Val Pro Gly Val Gly Val Pro Gly Val Gly
7400                7405                7410

Val Pro Gly Val Gly Val Pro Gly Val Gly Val Pro Gly Val Gly
7415                7420                7425

Val Pro Gly Val Gly Val Pro Gly Val Gly Val Pro Gly Val Gly
7430                7435                7440

Val Pro Gly Val Gly Val Pro Gly Val Gly Val Pro Gly Val Gly
7445                7450                7455

Val Pro Gly Val Gly Val Pro Gly Val Gly Val Pro Gly Val Gly
7460                7465                7470

Val Pro Gly Val Gly Val Pro Gly Val Gly Val Pro Gly Val Gly
7475                7480                7485

Val Pro Gly Val Gly Val Pro Gly Val Gly Val Pro Gly Val Gly
7490                7495                7500

Val Pro Gly Val Gly Val Pro Gly Val Gly Val Pro Gly Val Gly
7505                7510                7515

Val Pro Gly Val Gly Val Pro Gly Val Gly Val Pro Gly Val Gly
7520                7525                7530

Val Pro Gly Val Gly Val Pro Gly Val Gly Val Pro Gly Val Gly
7535                7540                7545

Val Pro Gly Val Gly Val Pro  Gly Val Gly Val Pro
7550                7555                7560

<210> SEQ ID NO 2
<211> LENGTH: 6
<212> TYPE: PRT
<213> ORGANISM: Artificial Sequence
<220> FEATURE:
<223> OTHER INFORMATION: synthetic construct

<400> SEQUENCE: 2

```
Gly Ala Gly Ala Gly Ser
1               5

<210> SEQ ID NO 3
<211> LENGTH: 5
<212> TYPE: PRT
<213> ORGANISM: Artificial Sequence
<220> FEATURE:
<223> OTHER INFORMATION: synthetic construct

<400> SEQUENCE: 3

Gly Val Gly Val Pro
1               5

<210> SEQ ID NO 4
<211> LENGTH: 5
<212> TYPE: PRT
<213> ORGANISM: Artificial Sequence
<220> FEATURE:
<223> OTHER INFORMATION: synthetic construct
<220> FEATURE:
<221> NAME/KEY: misc_feature
<222> LOCATION: (2)..(2)
<223> OTHER INFORMATION: Xaa can be any naturally occurring amino acid
      other than valine

<400> SEQUENCE: 4

Gly Xaa Gly Val Pro
1               5
```

The invention claimed is:

1. An embedded organoid for improved histological sample preparation comprising:
  an organoid embedded within a hydrogel matrix, the hydrogel matrix having a chemical composition consisting essentially of one or more silk-elastin-like polymers (SELPs), water, and an optional bulking agent, wherein the hydrogel matrix has undergone a temperature-induced shape change to encapsulate the organoid following placement of the organoid at a receiving area of the hydrogel matrix, and
  wherein subjecting the embedded organoid to histological sample preparation involving sectioning the embedded organoid results in a histological sample with reduced organoid damage when compared to a comparison histological sample prepared by subjecting a non-embedded organoid to the histological sample preparation involving sectioning the non-embedded organoid.

2. The embedded organoid of claim 1, wherein the one or more SELPs comprise SEQ ID NO:1, wherein a ratio of (i+j+k) to n is between 3:1 and 12:1, wherein n is 1, 2, or 3, wherein i is between 0 and 35, wherein k is 1, wherein j is between 0 and 36, wherein i+j is between 3 and 35, wherein x is between 5 and 20, and wherein X is an amino acid other than valine.

3. The embedded organoid of claim 2, wherein n is 2, wherein i is 4, wherein j is 3, and wherein X is tyrosine.

4. The embedded organoid of claim 1, wherein the temperature-induced shape change applies a force that does not damage the organoid.

5. The embedded organoid of claim 1, the chemical composition comprising the bulking agent.

6. The embedded organoid of claim 5, wherein the bulking agent is silk fibroin.

7. The embedded organoid of claim 6, wherein the silk fibroin is enzymatically crosslinked between silk fibroin molecules.

8. The embedded organoid of claim 6, wherein the silk fibroin is enzymatically crosslinked to the one or more SELPs.

9. The embedded organoid of claim 1, wherein the one or more SELPs is enzymatically crosslinked between different molecules of the one or more SELPs, and wherein the one or more SELPs is optionally enzymatically crosslinked to the optional bulking agent.

10. The embedded organoid of claim 1, wherein a film that consists essentially of the one or more SELPs and water exhibits a reduction in surface area of at least 20% and at most 60% upon undergoing a thermal transition.

11. The embedded organoid of claim 1, wherein the one or more SELPs has a transition temperature of at least 20° C.

12. The embedded organoid of claim 1, wherein the one or more SELPs has a transition temperature of at most 60° C.

13. The embedded organoid of claim 1, wherein the organoid is a cerebral organoid.

14. An array comprising a plurality of the embedded organoids of claim 1.

15. A hydrogel matrix for receiving an organoid for histological sampling, the hydrogel matrix having a chemical composition and a pre-shape-change physical configuration, the chemical composition consisting essentially of one or more silk-elastin-like polymers (SELPs), water, and an optional bulking agent, wherein the pre-shape-change physical configuration includes a receiving area adapted to receive the organoid, wherein the chemical composition is adapted to provide a temperature-induced shape change, and wherein the pre-shape-change physical configuration and the temperature-induced shape change are adapted together to encapsulate the organoid upon placement of the organoid at the receiving area and exposure of the hydrogel matrix to a predetermined temperature for a predetermined length of time.

16. The hydrogel matrix of claim 15, wherein the predetermined temperature is at least 40° C. and at most 75° C.

17. The hydrogel matrix of claim 15, wherein the predetermined length of time is at least 5 minutes and at most 6 hours.

18. A histological sample produced by a method comprising:
   a) placing an organoid in a SELP hydrogel matrix;
   b) applying heat to induce a conformational change; and
   c) sectioning the embedded organoid to produce a histological sample.

19. The histological sample of claim 18, wherein the SELP hydrogel matrix comprises one or more SELPs wherein the one or more SELPs comprise SEQ ID NO: 1, wherein a ratio of (i+j+k) to n is between 3:1 and 12:1, wherein n is 1, 2, or 3, wherein i is between 0 and 35, wherein k is 1, wherein j is between 0 and 36, wherein i+j is between 3 and 35, wherein x is between 5 and 20, and wherein X is an amino acid other than valine.

20. The hydrogel matrix of claim 15, wherein the one or more SELPs comprise SEQ ID NO: 1, wherein a ratio of (i+j+k) to n is between 3:1 and 12:1, wherein n is 1, 2, or 3, wherein i is between 0 and 35, wherein k is 1, wherein j is between 0 and 36, wherein i+j is between 3 and 35, wherein x is between 5 and 20, and wherein X is an amino acid other than valine.

* * * * *